US010911428B1

United States Patent
Roth et al.

(10) Patent No.: US 10,911,428 B1
(45) Date of Patent: *Feb. 2, 2021

(54) USE OF METADATA FOR COMPUTING RESOURCE ACCESS

(71) Applicant: Amazon Technologies, Inc., Seattle, WA (US)

(72) Inventors: Gregory B. Roth, Seattle, WA (US); Kevin Ross O'Neill, Seattle, WA (US); Eric Jason Brandwine, Haymarket, VA (US); Brian Irl Pratt, Seattle, WA (US); Bradley Jeffery Behm, Seattle, WA (US); Nathan R. Fitch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,513

(22) Filed: Feb. 27, 2015

Related U.S. Application Data

(63) Continuation of application No. 13/149,619, filed on May 31, 2011, now Pat. No. 8,973,108.

(51) Int. Cl.
*H04L 29/06* (2006.01)
*H04L 9/32* (2006.01)

(52) U.S. Cl.
CPC ........ *H04L 63/0807* (2013.01); *H04L 9/3213* (2013.01); *H04L 63/08* (2013.01); *H04L 63/10* (2013.01); *H04L 63/20* (2013.01)

(58) Field of Classification Search
CPC ........................... H04L 63/0807; H04L 9/3213
See application file for complete search history.

(56) References Cited

U.S. PATENT DOCUMENTS

| 6,957,393 B2 | 10/2005 | Fano et al. |
| 7,073,195 B2 | 7/2006 | Brickell et al. |
| 7,512,965 B1 | 3/2009 | Amdur et al. |

(Continued)

FOREIGN PATENT DOCUMENTS

EP 2257026 A1 * 12/2010 ........... G06F 21/335

OTHER PUBLICATIONS

Peng, Guojun; Pan, Xuanchen; Zhang, Huanguo; Fu, Jianming; "Dynamic Trustiness Authentication Framework Based on Software's Behavior Integrity", The 9th International Conference for Young Computer Scientists, IEEE, Nov. 18-21, 2008, pp. 2283-2288.*

(Continued)

*Primary Examiner* — Victor Lesniewski
(74) *Attorney, Agent, or Firm* — Kilpatrick Townsend & Stockton LLP

(57) ABSTRACT

Systems and methods for controlling access to one or more computing resources relate to generating session credentials that can be used to access the one or more computing resources. Access to the computing resources may be governed by a set of policies and requests for access made using the session credentials may be fulfilled depending on whether they are allowed by the set of policies. The session credentials themselves may include metadata that may be used in determining whether to fulfill requests to access the one or more computing resources. The metadata may include permissions for a user of the session credential, claims related to one or more users, and other information.

16 Claims, 22 Drawing Sheets

(56) References Cited

U.S. PATENT DOCUMENTS

| | | | |
|---|---|---|---|
| 7,721,322 B2 | 5/2010 | Sastry et al. | |
| 7,913,084 B2 | 3/2011 | Medvinsky et al. | |
| 8,006,289 B2 | 8/2011 | Hinton et al. | |
| 8,059,820 B2 | 11/2011 | Malaviarachchi et al. | |
| 8,151,116 B2 | 4/2012 | van Der Horst et al. | |
| 8,275,356 B2 | 9/2012 | Hickie | |
| 8,332,922 B2 | 12/2012 | Dickinson et al. | |
| 8,387,117 B2 | 2/2013 | Eom et al. | |
| 8,418,222 B2 | 4/2013 | Gbadegesin et al. | |
| 8,453,198 B2 | 5/2013 | Band et al. | |
| 8,533,772 B2 | 9/2013 | Garg et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,745,205 B2 | 6/2014 | Anderson et al. | |
| 8,769,642 B1 | 7/2014 | O'Neill et al. | |
| 8,776,204 B2 | 7/2014 | Faynberg et al. | |
| 8,973,108 B1 | 3/2015 | Roth et al. | |
| 9,106,646 B1* | 8/2015 | Zheng | H04L 63/0853 |
| 2002/0016840 A1 | 2/2002 | Herzog et al. | |
| 2002/0083014 A1* | 6/2002 | Brickell | G06Q 20/206 |
| | | | 705/76 |
| 2002/0162019 A1 | 10/2002 | Berry et al. | |
| 2003/0018913 A1* | 1/2003 | Brezak | H04L 63/0807 |
| | | | 726/4 |
| 2003/0145223 A1* | 7/2003 | Brickell | G06F 21/33 |
| | | | 726/10 |
| 2003/0188117 A1 | 10/2003 | Yoshino et al. | |
| 2005/0060580 A1 | 3/2005 | Chebolu et al. | |
| 2005/0080914 A1 | 4/2005 | Lerner et al. | |
| 2005/0132215 A1 | 6/2005 | Wang et al. | |
| 2006/0004662 A1* | 1/2006 | Nadalin | H04L 63/02 |
| | | | 705/50 |
| 2006/0070116 A1 | 3/2006 | Park | |
| 2006/0075462 A1 | 4/2006 | Golan et al. | |
| 2006/0080546 A1* | 4/2006 | Brannon | G06F 21/6218 |
| | | | 713/185 |
| 2006/0094406 A1 | 5/2006 | Cortegiano | |
| 2006/0094410 A1 | 5/2006 | Cortegiano | |
| 2006/0100928 A1 | 5/2006 | Walczak et al. | |
| 2006/0130100 A1 | 6/2006 | Pentland | |
| 2006/0149677 A1 | 7/2006 | Shahine et al. | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0282878 A1 | 12/2006 | Stanley et al. | |
| 2006/0294388 A1* | 12/2006 | Abraham | G06F 21/35 |
| | | | 713/182 |
| 2007/0107048 A1* | 5/2007 | Halls | G06F 21/33 |
| | | | 726/4 |
| 2007/0186102 A1 | 8/2007 | Ng | |
| 2007/0277231 A1 | 11/2007 | Medvinsky et al. | |
| 2008/0010665 A1 | 1/2008 | Hinton et al. | |
| 2008/0040773 A1 | 2/2008 | AlBadarin et al. | |
| 2008/0066150 A1 | 3/2008 | Lim | |
| 2008/0168530 A1 | 7/2008 | Kuehr-McLaren et al. | |
| 2008/0189776 A1* | 8/2008 | Constable | H04L 12/1822 |
| | | | 726/7 |
| 2008/0222694 A1 | 9/2008 | Nakae | |
| 2008/0301630 A1 | 12/2008 | Arnold et al. | |
| 2008/0313719 A1 | 12/2008 | Kaliski, Jr. et al. | |
| 2009/0049518 A1 | 2/2009 | Roman et al. | |
| 2009/0094164 A1* | 4/2009 | Fontaine | G06Q 20/3674 |
| | | | 705/67 |
| 2009/0172793 A1 | 7/2009 | Newstadt et al. | |
| 2009/0320093 A1 | 12/2009 | Glazier et al. | |
| 2010/0037304 A1 | 2/2010 | Canning et al. | |
| 2010/0088236 A1* | 4/2010 | Karabulut | G06F 21/10 |
| | | | 705/59 |
| 2010/0125894 A1* | 5/2010 | Yasrebi | H04L 12/2818 |
| | | | 726/4 |
| 2010/0161965 A1* | 6/2010 | Solin | H04L 9/006 |
| | | | 713/155 |
| 2010/0205649 A1 | 8/2010 | Becker et al. | |
| 2010/0269156 A1 | 10/2010 | Hohlfeld et al. | |
| 2011/0078107 A1 | 3/2011 | Almeida et al. | |
| 2011/0154376 A1* | 6/2011 | Consul | G06F 16/95 |
| | | | 719/328 |
| 2011/0167479 A1 | 7/2011 | Maes | |
| 2011/0225643 A1* | 9/2011 | Faynberg | G06F 21/31 |
| | | | 726/10 |
| 2011/0231921 A1* | 9/2011 | Narayanan | G06F 21/335 |
| | | | 726/9 |
| 2011/0231940 A1 | 9/2011 | Perumal et al. | |
| 2011/0265172 A1 | 10/2011 | Sharma et al. | |
| 2011/0296497 A1* | 12/2011 | Becker | H04L 63/0807 |
| | | | 726/4 |
| 2011/0320606 A1 | 12/2011 | Madduri et al. | |
| 2012/0023556 A1* | 1/2012 | Schultz | G06F 21/41 |
| | | | 726/4 |
| 2012/0036551 A1 | 2/2012 | Le Saint et al. | |
| 2012/0110636 A1 | 5/2012 | Van Biljon et al. | |
| 2012/0159577 A1 | 6/2012 | Belinkiy et al. | |
| 2012/0174198 A1* | 7/2012 | Gould | H04L 63/0807 |
| | | | 726/6 |
| 2012/0240211 A1* | 9/2012 | Counterman | H04L 9/321 |
| | | | 726/9 |
| 2012/0240212 A1* | 9/2012 | Wood | G06F 21/33 |
| | | | 726/10 |
| 2012/0254957 A1* | 10/2012 | Fork | G06F 21/33 |
| | | | 726/6 |
| 2012/0291090 A1* | 11/2012 | Srinivasan | G06F 21/604 |
| | | | 726/1 |
| 2013/0125223 A1* | 5/2013 | Sorotokin | H04L 9/3213 |
| | | | 726/6 |
| 2013/0132232 A1 | 5/2013 | Pestoni et al. | |
| 2014/0020051 A1* | 1/2014 | Lu | H04L 63/10 |
| | | | 726/1 |
| 2014/0068746 A1* | 3/2014 | Gonzalez Martinez | H04L 63/08 |
| | | | 726/9 |

OTHER PUBLICATIONS

U.S. Appl. No. 12/961,104, "Distributed Policy Enforcement With Optimizing Policy Transformations", U.S. Patent Application, filed Dec. 6, 2010, Dec. 6, 2010.

U.S. Appl. No. 12/961,104, "Non-Final Office Action", dated Mar. 18, 2013, 16 pages.

U.S. Appl. No. 12/961,182, "Distributed Policy Enforcement With Verification Mode", U.S. Patent Application, filed Dec. 6, 2010, Dec. 6, 2010.

U.S. Appl. No. 12/961,182, "Non-Final Office Action", dated Dec. 21, 2012, 10 pages.

U.S. Appl. No. 13/149,619, "Final Office Action", dated May 16, 2013, 22 pages.

U.S. Appl. No. 13/149,619, "Final Office Action", dated Jun. 12, 2014, 31 pages.

U.S. Appl. No. 13/149,619, "Non-Final Office Action", dated Jan. 22, 2013, 16 pages.

U.S. Appl. No. 13/149,619, "Non-Final Office Action", dated Feb. 4, 2014, 27 pages.

U.S. Appl. No. 13/149,619, "Notice of Allowance", dated Nov. 5, 2014, 13 pages.

U.S. Appl. No. 13/149,718, "Non-Final Office Action", dated Jan. 28, 2013, 18 pages.

Ben-Ghorbel-Talbi et al., "Managing Delegation in Access Control Models", International Conference on Advanced Computing and Communications, Dec. 18-21, 2007, pp. 744-751.

Berners-Lee et al., "Uniform Resource Identifier (URI): Generic Syntax, Request for Comments (RFC) 3986", Network Working Group, Jan. 2005.

Liscano et al., "A Context-based Delegation Access Control Model for Pervasive Computing", 21st International Conference on Advanced Information Networking and Applications Workshops, vol. 2, May 21-23, 2007, pp. 44-51.

(56) References Cited

OTHER PUBLICATIONS

Wang et al., "Extending the Security Assertion Markup Language to Support Delegation for Web Services and Grid Services", IEEE International Conference on Web Services, vol. 1, Jul. 11-15, 2005, pp. 67-74.

* cited by examiner

Your Request to Access the Storage Service Was Denied

Yekateryna628, performing the requested operation would cause you to exceed your cost limit. (More info.)

If you believe you received this message in error, please contact customer service.

2800

USE OF METADATA FOR COMPUTING RESOURCE ACCESS

CROSS REFERENCE TO RELATED APPLICATIONS

This application is a continuation of allowed U.S. patent application Ser. No. 13/149,619, filed May 31, 2011, entitled "USE OF METADATA FOR COMPUTING RESOURCE ACCESS", which incorporates by reference for all purposes the full disclosures of U.S. patent application Ser. No. 12/961,182, entitled "DISTRIBUTED POLICY ENFORCEMENT WITH VERIFICATION MODE" filed on Dec. 6, 2010, and U.S. patent application Ser. No. 12/961,104 entitled "DISTRIBUTED POLICY ENFORCEMENT WITH OPTIMIZING POLICY TRANSFORMATIONS" filed on Dec. 6, 2010. This application also incorporates by reference for all purposes the full disclosure of U.S. Pat. No. 8,769,642, filed on May 31, 2011, entitled "TECHNIQUES FOR DELEGATION OF ACCESS PRIVILEGES.

BACKGROUND

Modern computing networks provide access to a wide variety of computing resources such as data archives, search engines, data processing, data management, communications, and electronic marketplaces, as well as media and entertainment services. As the number and size of such computing resources, and their user communities, have grown and become more sophisticated, a need has arisen to establish increasingly sophisticated usage policies. For example, such policies may include policies that address security, privacy, access, regulatory and cost concerns. Policies may be applied to various users to control access to various computing resources accordingly. As just one example, some users may be allowed to read, write, and delete a certain set of data while other users may be allowed only to read the data and while other users may have no access to the set of data.

Policy enforcement often includes user authentication wherein a user, through various processes, confirms his or her identity in order to gain access to one or more computing resources. For various reasons, a user may wish to grant access to another user who does not typically have access. In many instances, it may be desirable to grant access for a limited period of time and possibly to limit the amount of access granted for that time. In some of these instances and in other instances, it is often desirable to require a user (who may be a user to whom permissions have been delegated, but not necessarily so) to require more reliable authentication (such as multifactor authentication) for different types of access. Conventional techniques for accomplishing permission delegation and/or reliable authentication can be cumbersome and, in many instances, may involve unnecessary risk.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
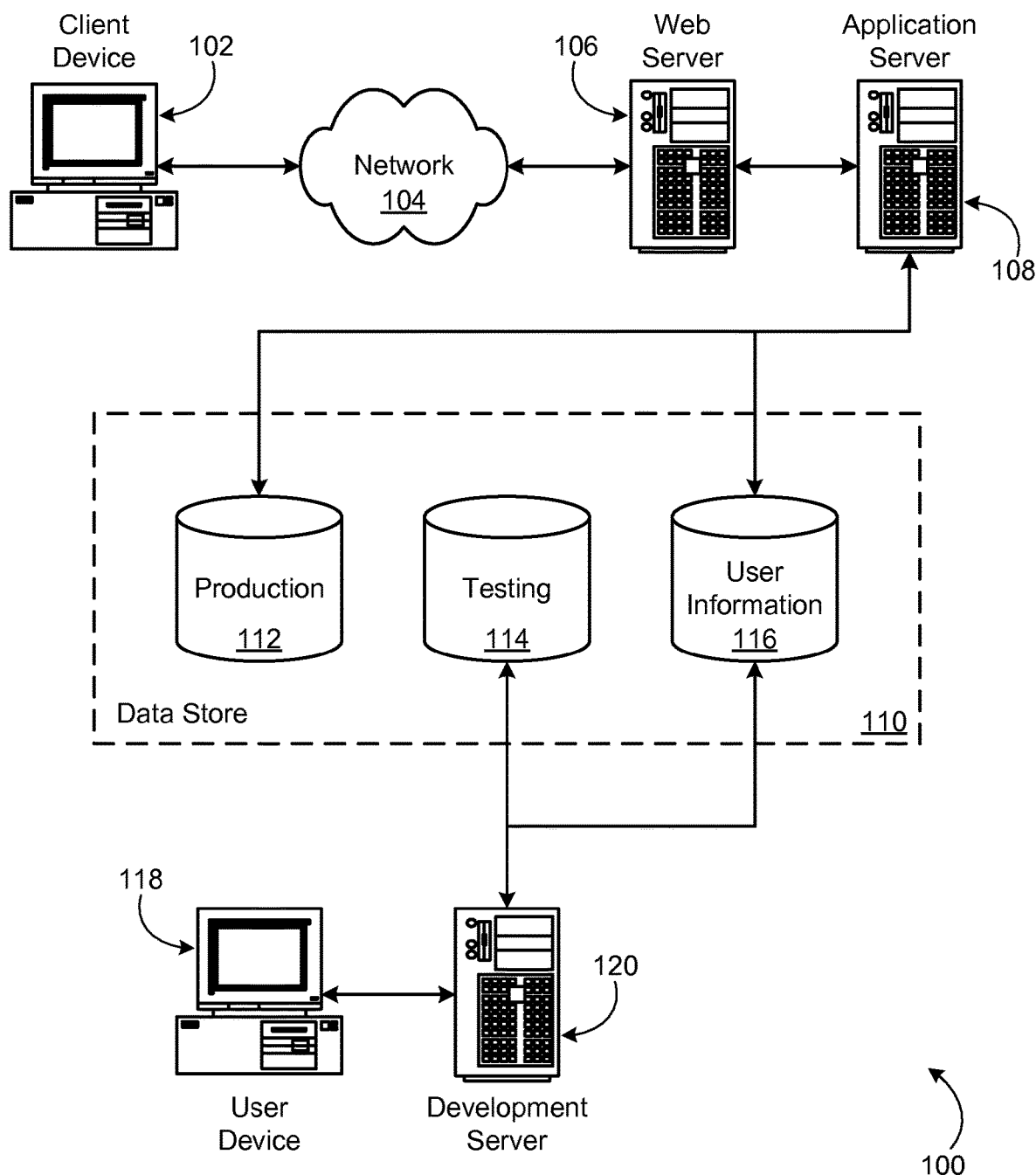
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques, including systems and methods, described and suggested herein allow users to delegate privileges related to access of one or more computing resources to other users. The computing resources may be physical and/or virtual computing resources, such as computer systems, storage systems, and/or other systems, including examples provided below. In an embodiment, a user, referred to herein as a delegator, authenticates himself or herself with an authentication system. The delegator may have one or more privileges relating to the access of one or more computing resources. The privileges may correspond to less than full access to the one or more computing resources accessible to the delegator. For example, one of the one or more computing resources may be a storage resource. The delegator may have the ability to perform read operations (such as by providing appropriate input for causing the read operations to be performed) in order to obtain stored data, but may lack the ability to perform operations that change the data, such as by write or delete operations. The privileges of a delegator may, at least in part, be defined by a set of policies that are applicable to the user. Once authenticated, the delegator may access the one or more computing resources according to his or her privileges.

If the delegator attempts to perform operations that are allowed, the attempted operations may be performed. If the delegator attempts to perform operations that are not allowed, the attempted operations may be denied. However, as described below, in addition to or as an alternative to accessing the one or more computing resources, embodiments of the present disclosure allow the delegator to delegate access privileges to one or more other users.

In an embodiment, a delegator is allowed to generate a session. A session may be a period of time for accessing one or more computing resources, which may be a definite or indefinite period of time, that is limited by parameters of a session credential that has been generated for the session. The session credential may be a collection of information that is usable for accessing the one or more computing resources according to the privileges of the delegator or a proper subset thereof. The session credential may include information related to the delegator such as authentication information, location information, information about applications used by the delegator, a time stamp for the session credential, one or more policies limiting access in connection with the session credential, an expiration time after which the session credential is invalid, a starting time before which the session credential is invalid, renewal parameters and/or requirements for renewing a session, credentials or a reference to credentials (such as a signing key) to be used to authenticate requests under the corresponding session, any restrictions on the number of uses allowed during the session, any use quotas for the session, any information about a party bearing financial responsibility for use of the session, any ownership information related to resources created under the session, any information about permissions to be applied by default to resources created under the session, and/or any other information that may be relevant in accordance with the various embodiments.

As noted, a session credential generated for a session may be used to delegate access privileges to one or more other users. Accordingly, in an embodiment, a session credential that has been generated for a session may be provided to one or more users other than the delegator. Such users may be referred to as a delegatee. Providing a session credential to a delegatee may be performed in any suitable manner. For instance, the delegator may provide the session credential to one or more delegatees by sending the session credential as part of an electronic message to the one or more delegatees. As another example, the delegator may identify one or more delegatees in connection with requesting a session credential to be generated. A system that generates the session credential (or another system that works in conjunction with a system that generates the session credential) may automatically send the generated session credential to the delegatees specified by the delegator. A session credential may be generated for each delegatee and/or a single session credential may be generated for multiple delegatees who each may use the generated session credential for access to one or more computing resources.

In an embodiment, the privileges that the delegator are allowed to delegate are no more than the privileges that the delegator has. Thus, for example, if policy restricts a delegator from deleting certain files, the delegator may be prevented from delegating the ability to delete the files to a delegatee. Control of the privileges delegated may be performed in any suitable manner. For example, in an embodiment, policy evaluation may be late binding such that policies are checked at the time requests to access one or more computing resources are made by a delegatee. For instance, if a delegatee provides a session credential in connection with a request to access a computing resource, any policies applicable to the delegatee may be checked. Policies applicable to the delegatee may include policies encoded in the session credential (i.e. one or more restrictions on the delegatee specified by the delegator), policies applicable to the delegatee that are maintained independently from the session credential (such as policies that would apply to the delegatee regardless of whether the delegatee is able to provide a session credential), and/or policies applicable to the delegator. Continuing the example of a request to delete a file, when a delegatee makes such a request to an appropriate computing resource, the computing resource (or another system working in connection with the computing resource) may check both whether the delegatee is able to make the request and whether the delegator is able to make the request. In this manner, if the delegator did not have the ability to delete the file, the delegatee would likewise lack the ability, even if the session credential specified that the delegatee had such access. Thus, the delegator may attempt to delegate access privileges without having to keep track of what privileges he or she has. Other ways of controlling access may also be used in addition or as an alternative. For example, when a delegator makes a request to generate a session credential, policy applicable to the delegator may be checked to ensure that the delegator is able to generate the requested session credential. The delegator may be prevented from having a session credential generated that indicates that a delegatee may have more access privileges than the delegator. In addition, the ability to delegate may be a privilege that is initially checked and/or that is checked at the time a delegatee makes a request.

In an embodiment, delegatees may become delegators to other delegatees, who themselves may become delegators to other delegatees, and so on. For example, a delegatee that has received a session credential may submit a request that a session credential be generated, such as in a manner described above. As delegatees become delegators, a delegation tree may be created where the delegation tree may be a directed graph having nodes representing delegators and/or delegatees and directed edges whose directions indicate delegation. As discussed, in various embodiments, delegators are prevented from delegating more access than the delegators themselves have. To control access, a set of policies applicable to a delegatee may be checked, such as described above. However, in addition to checking policies applicable to the delegatee and the user that delegated the privileges to the delegatee, policies applicable to all appropriate delegators may be checked. In the delegation tree, for instance, for a delegatee represented by a node in the tree, policies applicable to all users represented by nodes in the tree above the node representing the delegatee may be checked. In this manner, with multiple delegators, in an embodiment, no single user is allowed to delegate more than the original delegator. As above, policy checking may be performed at the time a request for access to one or more computing resources is made and/or at other times, such as when a request to generate a session credential is made.

As discussed above, a session credential may include various metadata that may be useful for various purposes. The metadata may include claims attesting to some fact of the user that requested the session credential. For instance, in addition to data listed above, data that may be included in a session credential may include information that states one or more claims with respect to authentication of a user that requested the session credential. The authentication claims may include information stating that a password has been verified, a timestamp corresponding to a time of authentication, a symmetric signature, an asymmetric signature, a certificate, and the like. Authentication information may also include claims regarding multifactor authentication techniques that were utilized by the user. Multifactor authentication information may indicate, for instance, that the user authenticated himself or herself using a one-time password (OTP), a smartcard, biometric techniques (such as techniques involving fingerprints, retinas, palms, and/or voice). Claims may also include claims regarding the user's location, and claims regarding one or more principals (such as delegators) that started the corresponding session or otherwise performed some role in initiating the session. Other information that may be included in the metadata includes, but is not limited to, information attesting to aspects of a computing environment, claims about applications and/or operating systems, and, generally, any useful information.

In an embodiment, metadata in a session credential may be used to authorize one or more requests to access one or more computing resources. For instance, a policy may require that completion of a certain type of authentication procedure (such as a multifactor authentication procedure) is a prerequisite for performing one or more operations. Performance of the procedure may incur a cost, such as a financial cost, or a resource cost (such as occupation of available processing, bandwidth, and other resources). As noted, a session credential may encode whether the authentication procedure was completed and may encode related information (such as an authentication token received as a result of completing the authentication procedure). When such a session credential is provided in connection with a request to perform an operation, completion of the requisite authentication procedure may be verified using the information in the session credential. Using a session credential in this manner may provide many advantages. For example, if an authentication procedure is required that is cumbersome for the user and/or that is computationally resource intensive, use of the session credential may allow for a single completion of the authentication procedure to be used for multiple requests, thereby lessening the burden on both the user and computing resources involving authentication. In this manner, techniques of the present disclosure allow for amortization of one or more costs over multiple transactions.

More generally, the session credential may encode information that is requisite to fulfill a set of one or more conditions for performing one or more operations in connection with one or more computing resources. A user may request a session and a session credential may be generated accordingly. The user himself or herself may utilize the generated session credential (i.e. delegate access to himself or herself) or may provide (or cause to have provided) the session credential to one or more other users, as above. The session credential may be provided in connection with requests to access one or more computing resources and some or all of the information in the session credential may be used in decisions whether to authorize the requests.

As noted above, various embodiments of the present disclosure make use of policies. Policies may be specified with a convenient policy specification language and/or user interface. However, such user-specified policies may be inefficient for the purposes of policy enforcement, particularly as the set of user-specified policies grows large. In at least one embodiment, user-specified policies may be transformed and/or processed into a normal policy form ("normal form"). The normal form may include a defined set of policy elements, each with a defined set of possible values. For example, the set of policy elements may include an "actions" element corresponding to a set of actions governed by the policy, a "principals" element corresponding to a set of principals or actors with respect to the set of actions, a "resources" element corresponding to a set of resources or subjects of the action, and/or a "conditions" element corresponding to a set of conditions to be satisfied before the policy is enforced.

The set of normal form policies may be efficiently optimized, for example, optimized for efficient indexing and/or optimized with respect to set size. Normal form policies may be split and/or joined with respect to policy elements, and duplicates efficiently removed. Normal form policies may be efficiently indexed with respect to policy element values and/or particular subsets of policy element values. For example, when the set of normal form policies are to be enforced with respect to a variety of computing resources, the set may be indexed by computing resource, computing resource type, computing resource server, and suitable combinations thereof. Subsets of the set of normal form policies may be distributed to multiple policy enforcement components based on the indexing and/or based on a relevance of particular policy subsets to particular policy enforcement components.

A virtual resource provider capable of provisioning a variety of virtual computing resources may include a centralized policy management service that maintains the set of normalized policies and distributes appropriate subsets to multiple policy enforcement components distributed throughout the virtual resource provider. Alternatively, or in addition, normal form policies may be maintained local to particular policy enforcement components and/or associated virtual computing resource implementation services. As a further alternative, policies may be provided along with action requests. In each case, a policy may be compatible with the normal form, and be associated with and/or accompanied by cryptographic credentials that authenticate and/or authorize the policy and/or an associated user. For example, the user may be authorized to set policies with respect to a particular set of computing resources. Such policies themselves are an example of a computing resource that may be subject to policy control.

Requests with respect to resources may be submitted to one or more policy enforcement components. For example, a request may be submitted to one or more policy enforcement components locally maintaining one or more policies that are relevant to the request. A distributed policy enforcement system with multiple policy enforcement components may have a "sandbox" mode and/or verification mode for processing requests. An authorized user may activate the verification mode with an indicator incorporated into a service interface, with an explicit verification mode service interface, and/or with a cryptographic verification mode token, the acquisition of which is subject to policy control. During the verification mode, requests may be evaluated with respect to policies as usual while requested actions are inhibited.

Such evaluations may depend on a set of decision data including user identity, a user's group memberships, protocol level details such as network source address of the request and protocol utilized to transmit the request, geographic regions associated with the request such as source geographic location of the request, regulatory classifications associated with the request, date and time. Authorized users may substitute pieces of decision data with specified values, for example, to enable an administrator to verify that a particular set of policies will govern the actions of a particular user or group of users as intended, and/or to diagnose problems. In verification mode, evaluation results, relevant policies, and decision data utilized during request evaluation may be collected, filtered and reported at a variety of levels of detail. The reported set of relevant policies may include normal form policies utilized to evaluate a request and/or a corresponding set of user-specified policies. Originating user-specified policies may be tracked during the policy normalization process to enable reporting of user-specified policies in verification mode. The reported set of decision data may include decision data not otherwise accessible to the report recipient.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, smartphones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
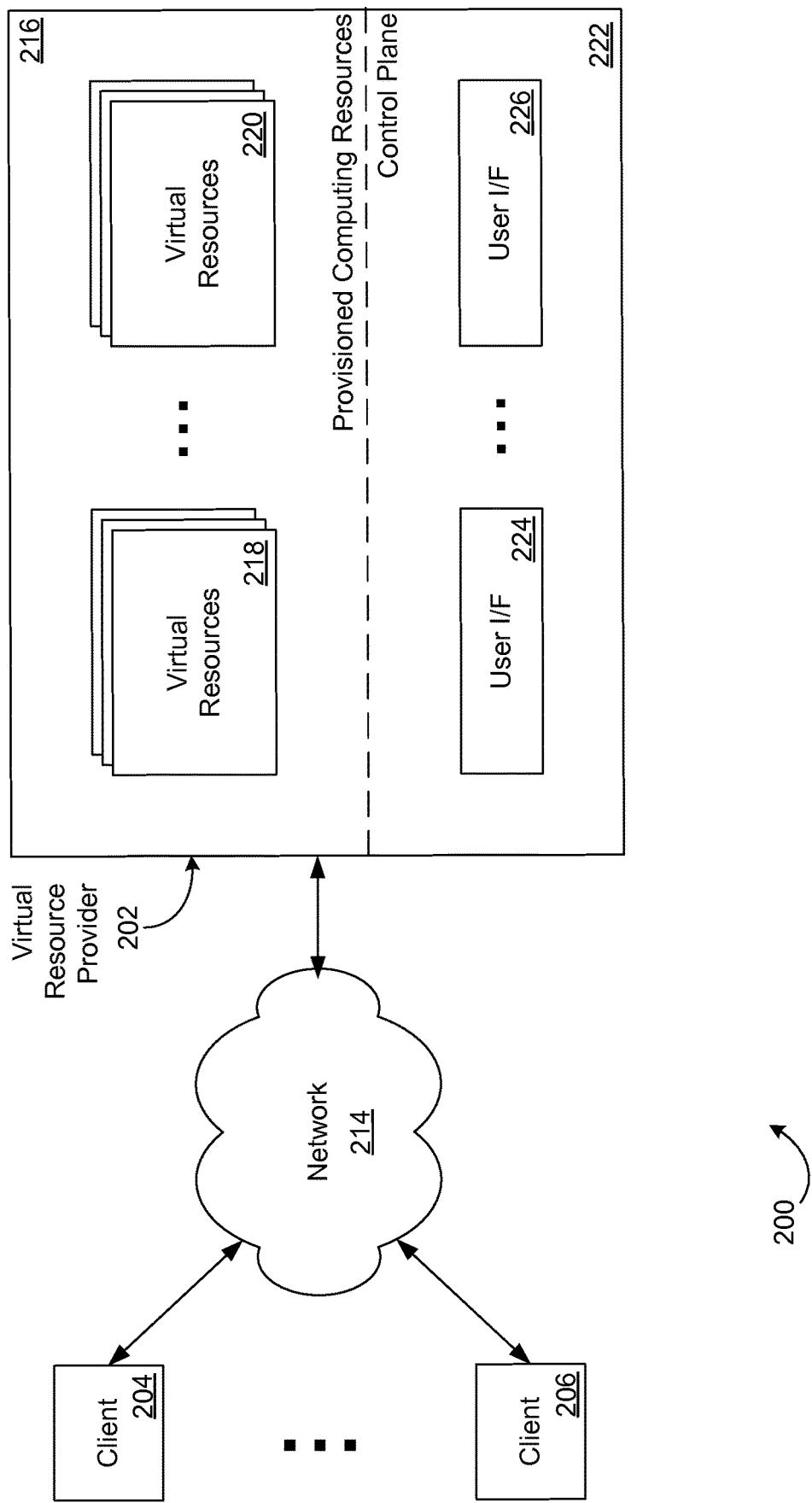
FIG. 2 is a schematic diagram depicting aspects of an example virtual computing resources architecture in accordance with at least one embodiment.

In at least one embodiment, one or more aspects of the environment 100 may incorporate and/or be incorporated into a virtual computing resources architecture. FIG. 2 depicts aspects of an example virtual computing resources architecture 200 in accordance with at least one embodiment. The example virtual computing resources architecture 200 includes a virtual resource provider 202 enabling various clients 204-206 to interact with provisioned computing resources 216 over a network 214. The provisioned computing resources 216 may include multiple types of virtual resource 218-220 such as virtual computing systems and clusters, virtual file system volumes, virtual private networks, data object stores, notification services, and suitable combinations thereof. The ellipsis between the types of virtual resource 218 and 220 indicates that the virtual resource provider 202 may maintain any suitable number of such computing resource types and/or instances. Ellipses are used similarly throughout the drawings.

Figure 3:
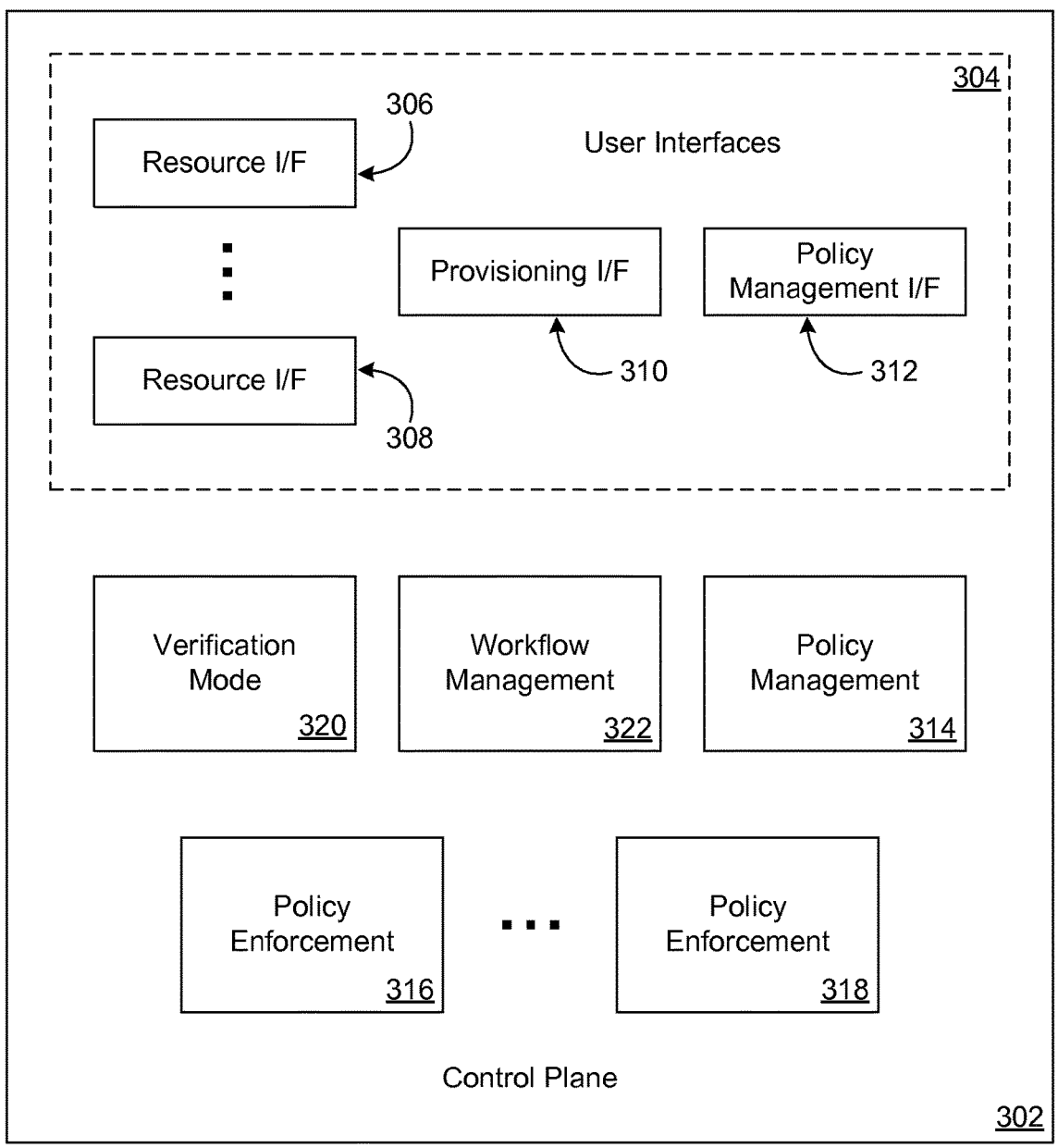
FIG. 3 is a schematic diagram depicting aspects of an example virtual resource provider control plane in accordance with at least one embodiment.

The virtual resource provider 202 may be implemented, at least in part, with server computers such as the Web server 106 and the application server 108 described above with reference to FIG. 1, and one or more data stores such as the data store 110 of FIG. 1, interconnected by a relatively high speed data network (not shown in FIG. 2). The server computers and/or data store(s) implementing the virtual resource provider 202 may include different types and/or configurations of server computers and/or data stores allocated to different virtual resource types 218-220 and to a control plane 222 of the virtual resource provider 202. The control plane 222 may include multiple user interfaces 224-226 that enable the clients 204-206 to interact with the virtual resource provider 202, including provisioning and interacting with the virtual resources 218-220, as well as setting policies with respect to the virtual resources 218-220. FIG. 3 depicts further aspects of a control plane 302 in accordance with at least one embodiment.

The user interfaces 304 of the control plane 302 may include any suitable type of user interface. For example, the user interface 304 may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. The user interfaces 304 may include multiple resource interfaces 306-308 enabling user interaction with the virtual resources 218-220 (FIG. 2). For example, there may be one of the resource interfaces 306-308 for each of the types of virtual resource 218-220. As another example, one or more of the resource interfaces 306-308 may enable interaction with multiple virtual resource types 218-220. Alternatively, or in addition, one or more of the types of virtual resource 218-220 may incorporate interfaces enabling direct interaction (e.g., by the clients 204-206) without mediation by one of the user interfaces 304.

The user interfaces 304 may further include a provisioning interface 310 enabling authorized users to provision, configure, re-configure and/or de-provision (collectively, "provision") the virtual resources 218-220 (FIG. 2). Although the example control plane 302 includes one such provisioning interface 310, embodiments may include any suitable number of such provisioning interfaces, including a provisioning interface for each type of virtual resource 218-220. Alternatively, or in addition, the resource interface 306 corresponding to a particular type of virtual resource 218 may incorporate the provisioning interface for that virtual resource type 218. The user interfaces 304 of the control plane 302 may still further include a policy management interface 312 enabling establishment, viewing, editing and/or deletion (collectively, "maintenance") of virtual resource provider 202 policies including policies with respect to the virtual resources 218-220 and with respect to policy management. Again, although the example control plane 302 includes one such policy management interface 312, embodiments may include any suitable number of policy management interfaces including a policy management interface for each type of virtual resource 218-220. The resource interface 306 corresponding to a particular type of virtual resource 218 may incorporate the policy management interface for that virtual resource type 218.

The control plane 302 may include a policy management component 314 configured at least to provide centralized policy management for the virtual resource provider 202 (FIG. 2). The policy management component 314 may receive user-specified policies, for example, specified with the policy management interface 312, and transform user-specified policies into a normal form. The policy management component 314 may then optimize the set of normal form policies, for example, for indexing and/or with respect to set size, and index the set of normal form policies based at least in part on one or more policy elements of the normal form. The policy management component 314 may then distribute the optimized normal form policies to a set of policy enforcement components 316-318 in a manner based at least in part on the index.

The control plane 302 may further include a verification mode component 320 configured at least to facilitate verification mode reporting. The verification mode component 320 may collect request evaluation results, normal form policies and/or decision data, map normal form policies to user-specified policies, and generate reports at specified levels of detail. For example, verification mode report detail levels may include a low detail level corresponding to an evaluation result and basic contextual information, a medium detail level that adds a set of policies considered to determine the evaluation result, a high detail level that further adds a set of decision data considered to determine the evaluation result, and a very high detail level that further adds virtual resource provider 202 (FIG. 2) operational information that may assist anomalous behavior diagnosis (e.g., debugging). For example, such operational information may include an identification of the set of policy enforcement components 316-318 involved in evaluating a request associated with the report. In at least one embodiment, verification mode may be a mechanism by which authorized users are permitted access to such virtual resource provider 202 operation information. Verification mode may correspond to a sandbox mode in the software development and/or testing sense, enabling configuration verification and/or testing without possible high cost consequences (e.g., in terms of financial and/or resource costs).

The verification mode component 320 may be further configured to process requests for verification mode tokens (e.g., cryptographic tokens), and to authenticate such tokens. For example, a verification mode token may be submitted with a request in order to indicate that the request is to be processed in verification mode. Alternatively, or in addition, verification mode tokens may authorize substitution of decision data (or at least a portion of the decision data) utilized when evaluating a request with respect to a set of policies. For example, the verification mode token may authorize substitution of decision data related to user identity, thus enabling an administrator to verify that a particular policy set has an intended effect with respect to a particular user.

The control plane 302 may include a workflow management component 322 configured at least to establish and maintain workflows such as resource workflows, provisioning workflows and/or policy management workflows established responsive to user interaction with the resource interfaces 306-308, the provisioning interface 310, and/or the policy management interface 312, respectively. Workflows may include one or more sequences of tasks to be executed to perform a job, such as virtual resource configuration, provisioning or policy management. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a policy management workflow may be created from a policy management workflow template configured with parameters by the policy management component 314.

The workflow management component 322 may modify, further specify and/or further configure established workflows. For example, the workflow management component 322 may select particular implementation resources of the virtual resource provider 202 to execute and/or be assigned to particular tasks. Such selection may be based at least in part on the computing resource needs of the particular task as assessed by the workflow management component 322. As another example, the workflow management component 322 may add additional and/or duplicate tasks to an established workflow and/or reconfigure information flow between tasks in the established workflow. Such modification of established workflows may be based at least in part on an execution efficiency analysis by the workflow management component 322. For example, some tasks may be efficiently performed in parallel, while other tasks depend on the successful completion of previous tasks.

Figure 4:
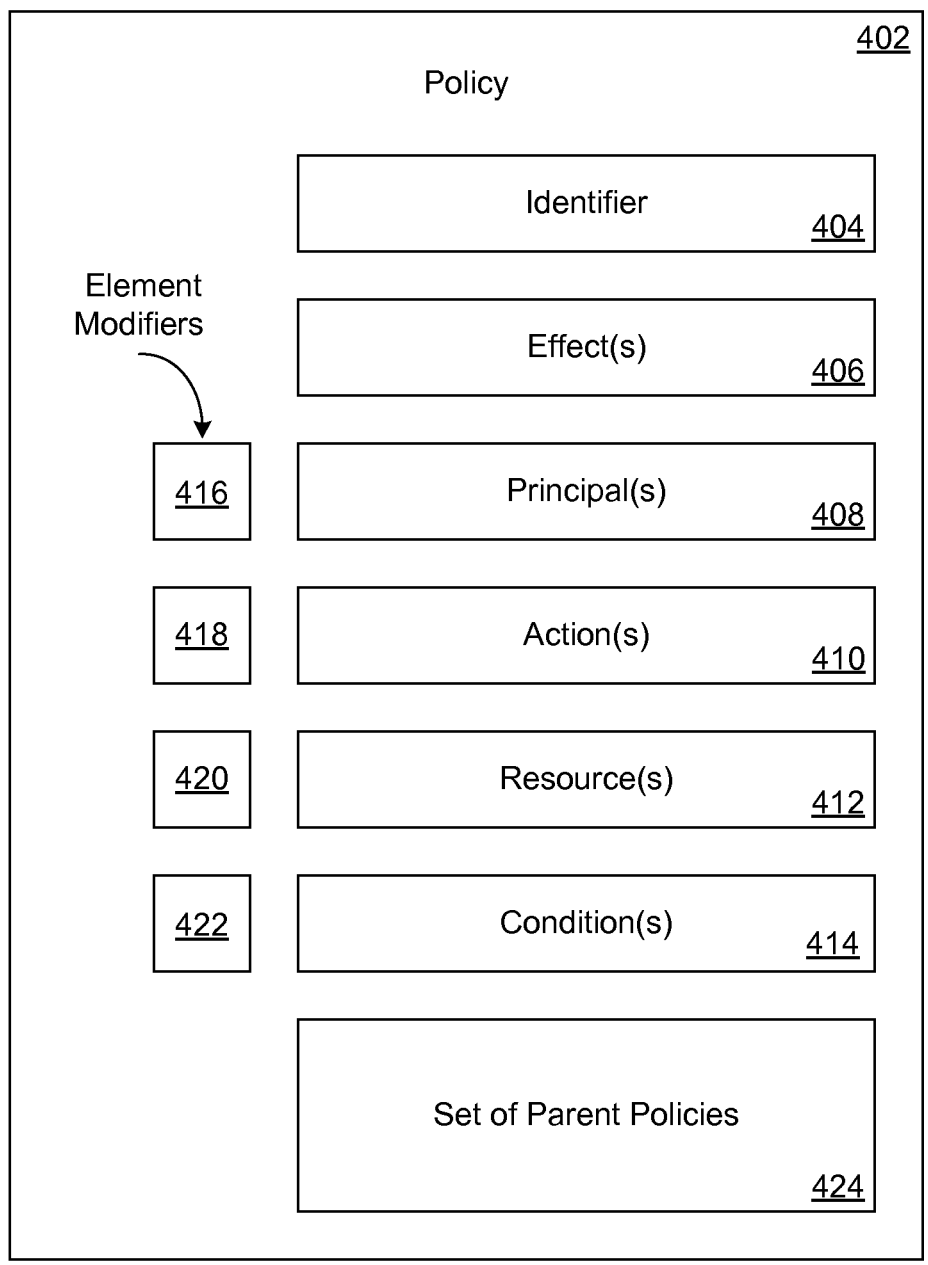
FIG. 4 is a schematic diagram depicting aspects of an example normal form policy in accordance with at least one embodiment.

The normal form of a policy may include a defined set of policy elements. FIG. 4 depicts aspects of an example normal form policy 402 in accordance with at least one embodiment. The policy 402 includes a policy identifier 404 uniquely identifying the policy 402, one or more effects 406 of the policy 402, reference to one or more principals 408 or actors governed by the policy, a specification of one or more actions 410 governed by the policy 402, reference to one or more resources 412 governed by the policy 402, a specification of one or more conditions 414 to be satisfied before the policy 402 is enforced, and a set of element modifiers 416, 418, 420, 422 corresponding to the policy elements 408, 410, 412, 414, respectively. The policy 402 may have an alphanumeric and/or Unicode representation and/or encoding sometimes called the policy document.

The policy identifier 404 may be any suitable identifier uniquely identifying the policy 402. For example, the policy identifier 404 may correspond to an alphanumeric and/or Unicode (collectively, "alphanumeric") string or integer number. The policy identifier 404 may be utilized to reference the policy 402. Examples of policy effects include permit and deny. The effect(s) 406 element of the policy 402 may specify such policy effects. For example, a particular policy may permit one or more principals 408 to take one or more actions 410 with respect to one or more resources 412, while another policy may deny a set of actions 410 to a set of principals 408.

The principal(s) 408 element of the policy 402 may specify one or more entities known to the virtual resource provider 202 (FIG. 2) that are capable of making requests of the virtual resource provider 202. Such entities may include users having a user account with the virtual resource provider 202, customers having a commercial account (e.g., a cost-tracking account) with the virtual resource provider 202, and groups of users and/or customers including role-based groups such as administrators. Such entities may be specified with any suitable identifier including user identifiers, customer account numbers, group identifiers, and alphanumeric strings.

The action(s) 410 element of the policy 402 may specify one or more actions capable of being performed by the virtual resource provider 202 (FIG. 2). Such actions may include actions capable of being performed by the virtual resources 218-220 of the virtual resource provider 202 and/or actions that may be requested with the user interfaces 224-226 of the virtual resource provider 202, including policy management actions. In at least one embodiment, actions specified by the action(s) 410 element correspond to elements of the user interfaces 224-226. Such actions may be specified with any suitable action identifier including interface element identifiers and alphanumeric strings.

The resource(s) 412 element of the policy 402 may specify one or more resources of the virtual resource provider 202 (FIG. 2) for which one or more of the action(s) 410 is valid. Such resources may include virtual resources 218-220, implementation resources, policies, and verification mode tokens. Such resources may be specified with any suitable resource identifier including resource identifiers in accordance with a uniform resource identifier (URI) standard such as Berners-Lee et al., "Uniform Resource Identifier (URI): Generic Syntax," Request for Comments (RFC) 3986, Network Working Group, January 2005.

The condition(s) 414 element of the policy 402 may specify a set of conditions to be satisfied before the policy 402 is enforced. For example, the condition(s) 414 may specify the conditions under which the principal(s) 408 are permitted to perform the action(s) 410 with respect to the resource(s) 412. Such conditions may be specified with any suitable condition specification language including suitable programming languages, and may include compound conditions, for example, specified with Boolean operators. Condition parameters may include any suitable data available to the virtual resource provider 202 (FIG. 2). Condition parameter examples include environmental data such as calendar date and time of day, and request-associated data such as originating network address, originating geographical location, originating political and/or administrative division and communication protocol employed.

By default, the policy 402 effect(s) 406 may be enforced when the specified principal(s) 408 request the specified action(s) 410 with respect to the specified resource(s) 412 and the specified set of condition(s) 414 are satisfied. However, the element modifiers 416-422 may indicate that the corresponding policy elements 408-414 specify exceptions—that is, that the policy 402 effect(s) 406 be enforced unless the specified principal(s) 408 are the actors, unless the specified action(s) 410 are requested, unless the specified resource(s) 412 are the subject of action and/or unless the specified set of conditions is satisfied. In addition, policy element 408-414 specifications may include "wildcard" values. For example, a '*' wildcard value may match all and/or any valid values of the policy elements 408-414. Alternatively, or in addition, wildcard values may be matched contextually. For example, a '*' wildcard value may match all and/or any values of the policy element 408-414 that are valid with respect to a particular user, customer, group, and/or other context of a particular request.

As described above with reference to FIG. 3, the policy management component 314 may transform user-specified policies into normal form policies, and optimize sets of normal form policies. The optimized set of normal form policies may differ significantly from the supplied set of user-specified policies. A single user-specified policy can result in the addition of multiple normal form policies. A single normal form policy can participate in enforcing multiple user-specified policies. In at least one embodiment, each normal form policy 402 maintains a set of references to "parent" policies 424 which the normal form policy 402 participates in enforcing. For example, the set of parent policies 424 may be updated during user-specified policy transformation and normal form policy set optimization operations.

Figure 5:
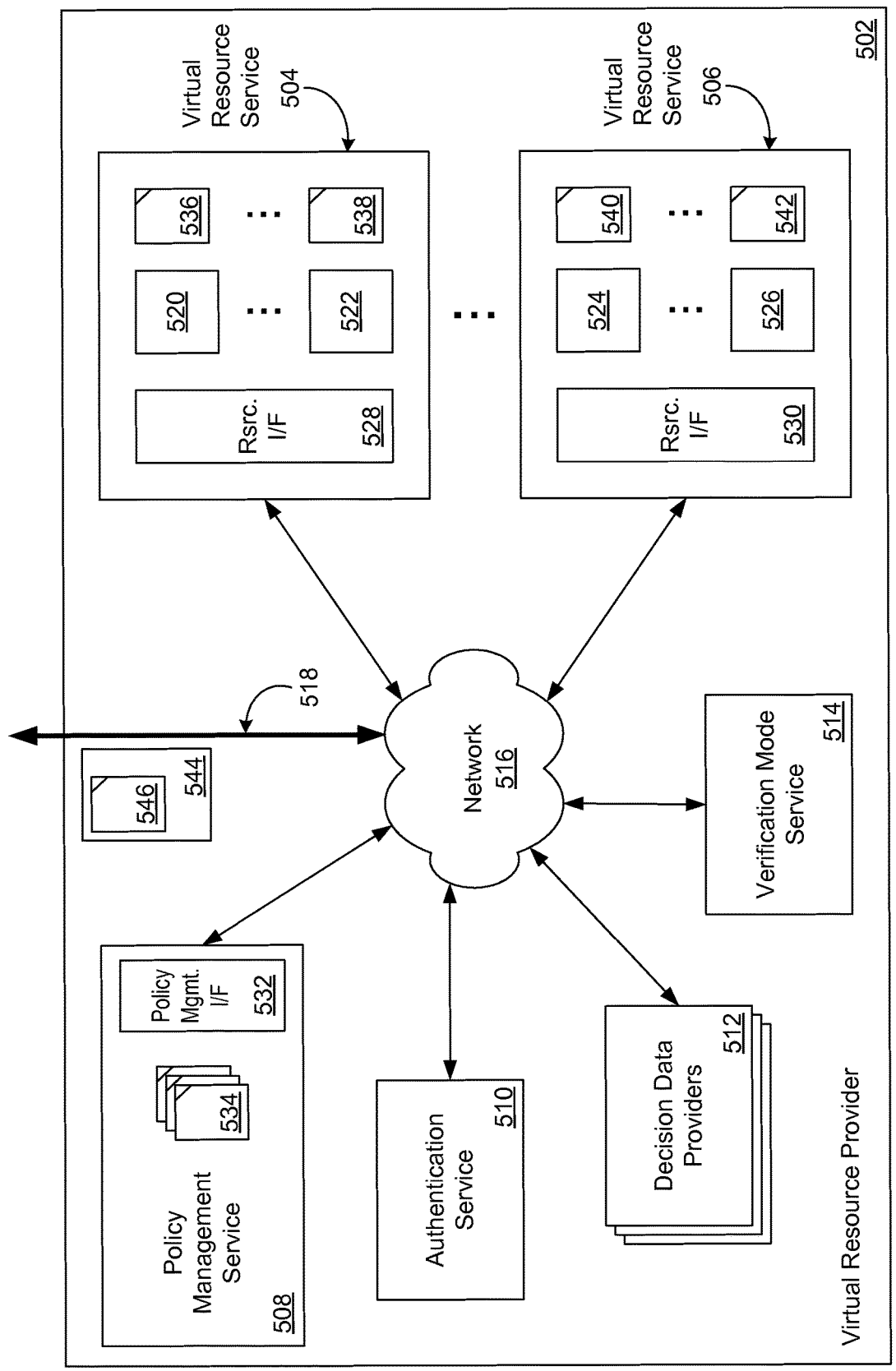
FIG. 5 is a schematic diagram depicting aspects of an example virtual resource provider in accordance with at least one embodiment.

The virtual resource provider 202 may be implemented as a collection of networked services. FIG. 5 depicts aspects of an example virtual resource provider 502 implemented in accordance with at least one embodiment. The virtual resource provider 502 includes multiple virtual resource services 504-506, a policy management service 508, an authentication service 510, a set of decision data providers 512, and a verification mode service 514, each interconnected by a network 516. The arrow 518 indicates that the network 516 is connected to the network 214 of FIG. 2.

Each virtual resource service 504, 506 may maintain a set of provisioned resources 520-522, 524-526 and incorporate a resource interface 528, 530. For example, each virtual resource service 504-506 may maintain one type of virtual resource 218-220 as described above with reference to FIG. 2, and incorporate a corresponding one of the resource interfaces 306-308 described above with reference to FIG. 3. The policy management service 508 may incorporate a policy management interface 532 corresponding to the policy management interface 312 of FIG. 3.

The policy management service 508 may act as a centralized policy management service for the virtual resource provider 502, managing, transforming, optimizing and distributing one or more sets of policies 534 to other services 504-506, 510-514 of the virtual resource provider 502. In addition, in at least one embodiment, services 504-506, 510-514 of the virtual resource provider 502 other than the policy management service 508 may maintain policies. For example, the virtual resource services 504-506 may each maintain a set of policies 536-538, 540-542 that are relevant to the respective set of provisioned resources 520-522, 524-526. Such policies 536-538, 540-542 may be established, viewed, edited and deleted with policy management interface 312 (FIG. 3) functionality integrated into the associated resource interface 528-530. Such policies 536-538, 540-542 may be compatible with the policies 534 maintained by the policy management service 508. For example, the policies 536-538, 540-542 may each have a form corresponding to the normal form policy 402 (FIG. 4). Further in addition, in at least one embodiment, policies may be maintained at a location external to the virtual resource provider 502, and supplied for enforcement as part of interactions with the services 504-514 of the virtual resource provider 502. For example, request 544 incorporates such a policy 546.

The authentication service 510 may provide authentication services for the virtual resource provider 502. For example, the authentication service 410 may authenticate an integrity and/or an authenticity of policies 534-542, 546. In addition, the authentication service 510 may authenticate an identity of clients 204-206 (FIG. 2), customers and/or users of the virtual resource provider 502. For example, the policy management interface 532 and/or the resource interfaces 528-530 may utilize the authentication service 510 to establish and/or verify an identify and/or authority of a user with respect to policies 534-542, 546 and/or provisioned resources 520-526. The authentication service 510 may utilize any suitable authentication mechanism, including any suitable cryptographic authentication mechanism, to provide the authentication services. Such authentication mechanisms are well-known in the art and need not be detailed here.

The decision data providers 512 may provide data required by policy enforcement components 316-318 (FIG. 3) to evaluate requests that are subject to policies. For example, the provisioned resources 520-526 may be associated with various labeling and/or naming schemes ("resource names"), and the decision data providers 512 may include a name resolution provider that maps or resolves such resource names to locations (e.g., network locations) within the virtual resource provider 502. The decision data providers 512 may further include providers of data required to determine whether the condition(s) 414 (FIG. 4) of the policy 402 are satisfied. For example, a particular policy may deny interaction with a particular resource from a specified set of geographic locations and/or regions (collectively, "geographic locations"). In such a case, the decision data providers 512 may include a geographic resolution provider capable of identifying a set of geographic locations associated with the request 544.

The verification mode service 514 may provide verification mode functionality (e.g., as described above with reference to the verification mode component 320 of FIG. 3) as a service to the other services 504-512 of the virtual resource provider 502. For example, the resource interfaces 528-530 and/or the policy management interface 532 may query the verification mode service 514 to authenticate a verification mode token and/or may provide evaluation results for reporting in response to a request. An example verification mode service is described below in more detail with reference to FIG. 7. However, the description first turns to further aspects of the policy management service 508 in accordance with at least one embodiment.

Figure 6:
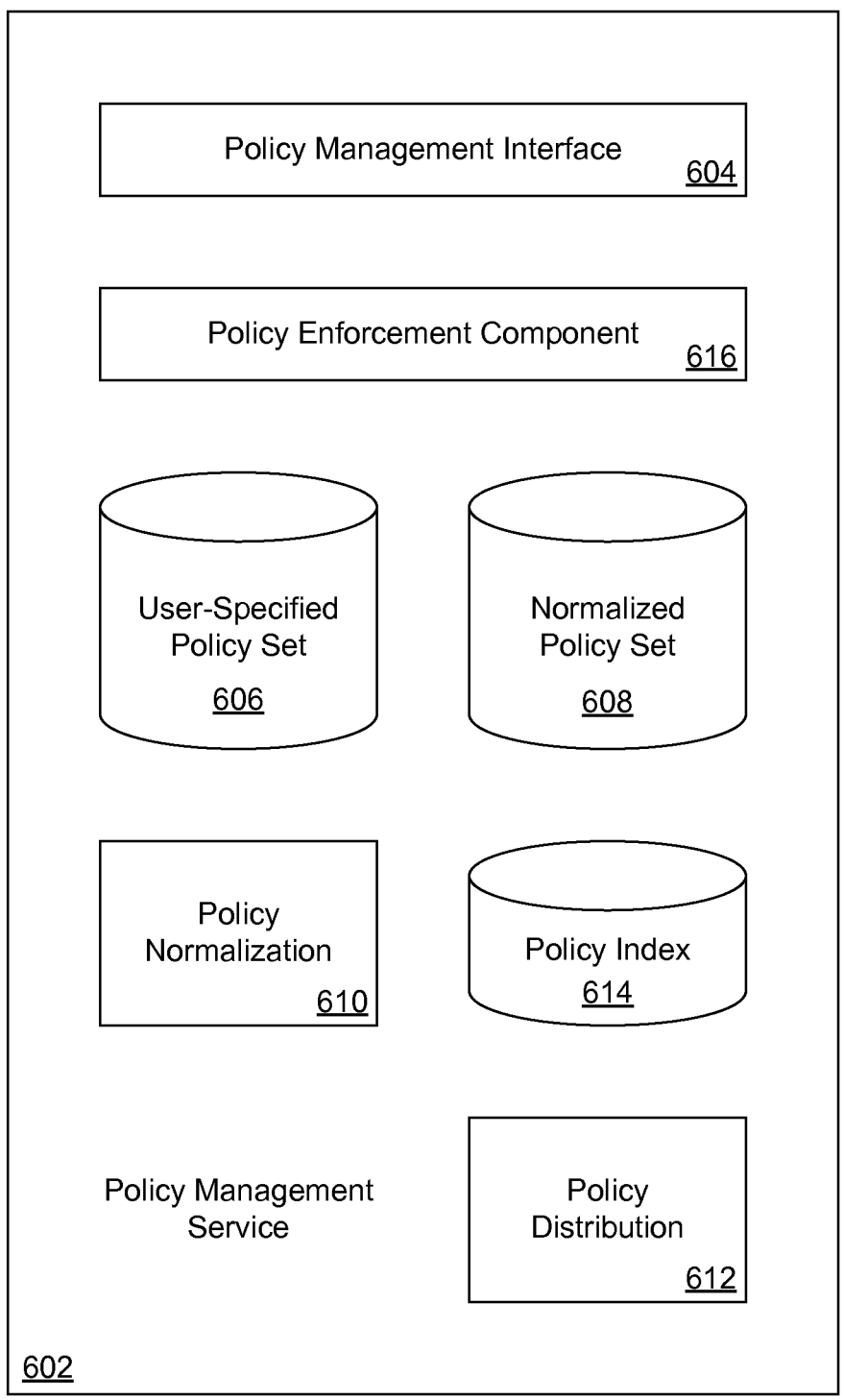
FIG. 6 is a schematic diagram depicting aspects of an example policy management service in accordance with at least one embodiment.

The policy management service 602 of FIG. 6 is an example of the policy management service 508 of FIG. 5, and includes a policy management interface 604 corresponding to the policy management interface 532 of FIG. 5. Users of the virtual resource provider 502 may interact with the policy management interface 604 to specify, view, edit and/or delete policies in a user-specified policy set 606 maintained by the policy management service 602. The policy management service 602 may further maintain a normalized policy set 608 corresponding to the user-specified set 606. The normalized policy set 608 may be maintained by a policy normalization component 610. The policy management service 602 may participate in policy enforcement; for example, the policy management service 602 may include a policy enforcement component 616 corresponding to one of the policy enforcement components 316-318 of FIG. 3. In particular, the policy enforcement component 616 may enforce policies referencing actions that may be requested with the policy management interface 604. Furthermore, in at least one embodiment, at least a portion of the normalized policy set 608, or a copy thereof, is distributed to policy enforcement components located throughout the virtual resource provider 502. The policy management service 602 may include a policy distribution component 612 configured at least to distribute the normalized policy set 608 throughout the virtual resource provider 502, for example, based at least in part on a policy index 614.

Policies in the user-specified policy set 606 may be specified with alphanumeric strings. A first example of such a policy is:
  permit administrators*
corresponding to permission for members of the group with identifier "administrators" to perform all actions with respect to all resources associated with a particular virtual resource provider 502 (FIG. 5) customer account. A second example is:
  deny jsmith*unless current_time in business_hours
corresponding to denying permission for a user with identifier "jsmith" to perform any action outside of business hours. A third example is:
  permit jsmith to {create, read, write, delete} data_object-_service:zone_1::/public/images
corresponding to permission for the user with identifier "jsmith" to create, read, write and delete data objects at a particular virtual resource having resource identifier "data_object_service:zone_1::/public/images". A fourth example is:
  permit msmith to configure
  {vcs::/example_corp/*, bds::/example_corp/*}
corresponding to permission for a user with identifier "msmith" to configure all virtual computer systems (provided by a virtual computing service "vcs") and block data volumes (provided by a block data service "bds") associated with a customer having customer identifier "example_corp". Each user-specified policy may be associated with a unique identifier.

The policy normalization component 610 may generate sets of normalized policies corresponding to user-specified policies, and store the normalized policies in the normalized policy set 608. For example, each policy in the normalized policy set 608 may have a form corresponding to the normal form policy 402 of FIG. 4. The policy normalization component 610 may generate multiple normal form policies corresponding to a user-specified policy, for example, due to decompounding with respect to policy elements 408-414. The fourth user-specified policy example described above may be decompounded to generate two normal form policies, both with the effect 406 element specifying a permit effect, the principal 408 element specifying the user with identifier "msmith", and the action 410 element specifying the configure action. For example, the resource 412 element of one of the normal form policies may specify all virtual computer systems associated with the customer identifier "example_corp", the resource 412 element of the other of the normal form policies may specify all block data volumes associated with the customer identifier "example_corp". In this example, the user-specified policy has been decompounded with respect to the resource 412 element. As another example, the policy normalization component 610 may be configured to decompound the first user-specified policy example described above with respect to the action 410 element and/or the resource 412 element.

Wildcards may be first "expanded" into a set of values, for example, based on a context of the user-specified policy, before being decompounded. The decompounding need not be complete with respect to policy element 408-414 (FIG. 4) values. For example, the policy normalization component 610 may be configured to protect particular subsets of policy element 408-414 values (policy element "atoms" or "indivisibles") from decompounding. As one example, the set of actions corresponding to "{create, read, write, delete}" may be protected from decompounding.

The policy normalization component 610 may reduce a size of the normalized policy set 608, for example, by reducing redundancy in the normalized policy set 608. The policy normalization component 610 may detect that a newly added normal form policy is contained within the scope of one or more of the normalized policy sets 608, and delete the newly added normal form policy from the normalized policy set 608. Normal form policies, such as the normal form policy 402 of FIG. 4, may correspond to sets of points in one or more policy spaces, for example, spaces having dimensions corresponding to the policy elements 408-414 of the normal form, and/or Boolean-valued functions over the policy spaces. Each effect 406 element value may correspond to such a policy space. For example, there may be a permit space and a deny space. The policy enforcement components 316-318 (FIG. 3) may be configured to require an explicit permit in the absence of a deny in order to permit a particular action, that is, to require a point in a permit space without a corresponding point in the deny space. Wildcards may correspond to regions of such policy spaces. Element modifiers 416-422 may be used to define complimentary sets of the policy spaces. The policy normalization component 610 may detect whether the normal form policy 402 is within the scope of a set of normal form policies (e.g., the normalized policy set 608) by determining whether the set of points corresponding to the normal form policy 402 is contained within the set of points corresponding to the set of normal form policies.

The policy normalization component 610 may further reduce the size of the normalized policy set 608 by compounding and/or recompounding normal form policies in the normalized policy set 608 with respect to policy elements 408-414 (FIG. 4). Some policy element 408-414 values may correspond to multiple other policy element 408-414 values, so that a single normal form policy 402 may correspond to a same policy space region as multiple other normal form policies. For example, a principal 408 element value corresponding to a group may be equivalent to multiple principal 408 element values corresponding to individual users. The policy normalization component 610 may be configured to detect compoundable subsets of the normalized policy set 608 and to compound the detected subsets along policy element 408-414 dimensions to configured granularities (which need not be the coarsest available granularity). Throughout generation and/or transformation of the normalized policy set 608, the policy normalization component 610 may be configured to maintain the set of parent policies 424 of each normal form policy 402. For example, the set of parent policies 424 may include the identifier of each user-specified policy that the normal form policy 402 participates in enforcing.

Different regions of the policy space(s) may be enforced by different policy enforcement components 316-318 (FIG. 3). Different policy enforcement components 316-318 may enforce overlapping, and even same, regions of the policy space(s). However, in at least one embodiment, different policy enforcement components 316-318 enforce disjoint regions of the policy space(s). The policy distribution component 612 may determine regions of the policy space(s), and corresponding subsets of the normalized policy set 608, to assign and/or distribute to the policy enforcement components 316-318. To facilitate such distribution, the policy distribution component 612 may establish and maintain the policy index 614. The policy index 614 may index the normalized policy set 608 with respect to policy element 408-414 (FIG. 4) values and/or subsets thereof. For example, the policy index 614 may index the normalized policy set 608 with respect to resource 412 and/or resource 412 type. Policies in the normalized policy set 608 may be multiply indexed, for example, with respect to multiple different policy element 408-414 values and/or value subsets. The policy distribution component 612 may distribute the normalized policy set 608 to the policy enforcement components 316-318 based at least in part on the policy index 614. For example, sets of indices of the policy index 614 may define policy enforcement domains corresponding to subsets of the normalized policy set 608, and the policy distribution component 612 may distribute such subsets to the policy enforcement components 316-318 as units. In at least one embodiment, each normal form policy 402 incorporates its indexing information and/or the policy index 614 is incorporated into the normalized policy set 608.

Figure 7:
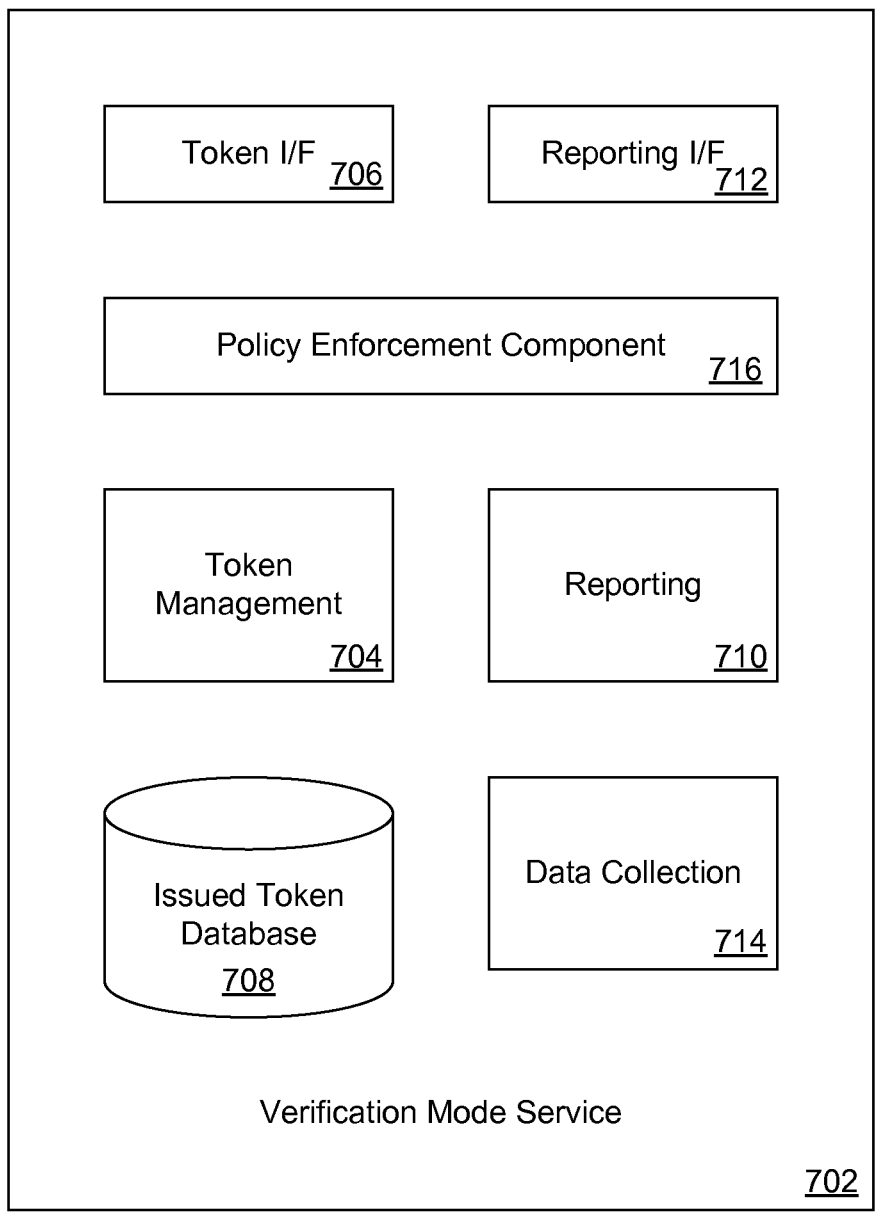
FIG. 7 is a schematic diagram depicting aspects of an example verification mode service in accordance with at least one embodiment.

The distributed nature of policy enforcement in the virtual resource provider 502 (FIG. 5) can complicate efforts to verify that a particular set of user-specified polices has its intended consequences. FIG. 7 depicts aspects of an example verification mode service 702 in accordance with at least one embodiment that can facilitate such verification. The verification mode service 702 may include a token management component 704 accessible through a token interface 706. The token management component 704 may issue verification mode tokens in response to authorized requests, record the issued tokens in an issued token database 708, and authenticate the issued tokens upon request. Following processing of the request 544 in verification mode, a reporting component 710 of the verification mode service 702 may prepare a verification mode report at a specified level of detail. Requests for such reports, as well as for level of detail specification, may be made with a reporting interface 712 of the verification mode service 702. Such report requests may not include all the data required by the reporting component 710. The verification mode service 702 may further include a data collection component 714 configured to interact with other services 504-512 of the virtual resource provider 502 to obtain the required data.

Policies with respect to actions that may be requested with the token interface 706 and/or the reporting interface may be enforced by a policy enforcement component 716 corresponding to one of the policy enforcement components 316-318 of FIG. 3. For example, such policies may define a set of users of the virtual resource provider 502 (FIG. 5) authorized to be issued verification mode tokens, and may require an authentic verification mode token before providing the verification mode report. The token management component 704 may issue multiple types of tokens; for example, tokens authorizing verification mode reporting may be a separate type from tokens authorizing substitution of decision data during verification mode processing of the request 544. Tokens authorizing substitution of different subsets and/or types of decision data may also be separate types. Verification mode policies may distinguish between different types of tokens. Generation, issuance, authentication and revocation of cryptographic tokens are well known in the art, and need not be described here in detail.

Requests at the reporting interface 712 may specify a type of report and/or level of reporting detail. For example, the workflow management component 322 (FIG. 3) may generate the request in response to detecting a verification mode request at one of the resource interfaces 306-308. The reporting component 710 may generate the requested report based on a corresponding report template, utilizing the data collection component 714 to collect data as necessary. Fields that may be included in the verification mode report include one or more results of evaluation of the verification mode request by one or more of the policy enforcement components 316-318, a subset of the normalized policy set 608 (FIG. 6) and/or the user-specified policy set 606 relevant to the verification mode request and/or utilized during the evaluation by the one or more policy enforcement components 316-318, decision data utilized during the evaluation, virtual resource provider 502 contextual operating data capable of influencing the evaluation, and/or versions thereof filtered and/or summarized to the specified level of detail. The reporting component 710 may be configured to map a set of normal form policies to a corresponding set of user-specified policies based at least in part on the set of parent policies 424 (FIG. 4) referenced by each normal form policy 402.

Figure 8:
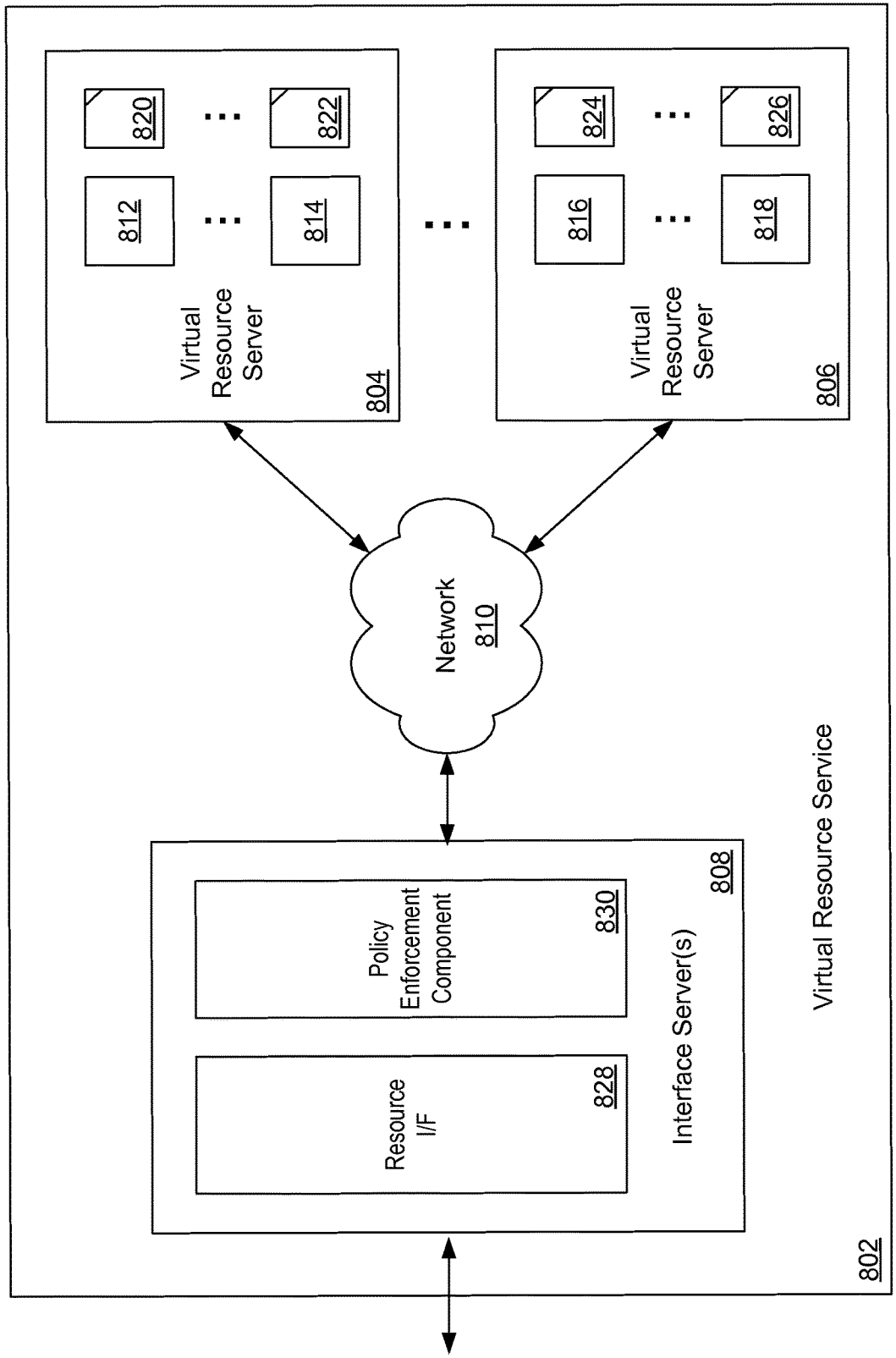
FIG. 8 is a schematic diagram depicting aspects of an example virtual resource service in accordance with at least one embodiment.

Each virtual resource service 504-506 (FIG. 5) may be implemented with a collection of physical server computers and/or network elements. FIG. 8 depicts aspects of an example virtual resource service 802 in accordance with at least one embodiment. The virtual resource service 802 depicted in FIG. 8 is an example of the virtual resource service 504 of FIG. 5. The example virtual resource service 802 includes multiple virtual resource servers 804-806 and one or more interface servers 808 interconnected by a network 810. The provisioned resources 520-522 and policies 536-538 of FIG. 5 may be distributed across the virtual resource servers 804-806 of FIG. 8 utilizing any suitable data distribution technique. For example, each virtual resource server 804, 806 may maintain a subset 812-814, 816-818 of the provisioned resources 520-522, and a corresponding subset 820-822, 824-826 of the policies 536-538. Such subsets may deliberately overlap for various purposes including data durability and service capability.

The interface server(s) 808 may (collectively) maintain a resource interface 828 and a policy enforcement component 830. The resource interface 828 may correspond to one of the resource interfaces 306-308 of FIG. 3. Similarly, the policy enforcement component 830 may correspond to one of the policy enforcement components 316-318 of FIG. 3. The policy enforcement component 830 of FIG. 8 may enforce policies referencing actions that may be requested with the resource interface 828 of FIG. 8. Such policies may include policies distributed by the policy management service 602 (FIG. 6), policies 820-826 stored on the virtual resource servers 804-806, and policies accompanying requests to the resource interface 828 such as the policy 546 of FIG. 5. For example, the resource interface 828 may require a "permit" evaluation by the policy enforcement component 830 before further processing a request.

Figure 9:
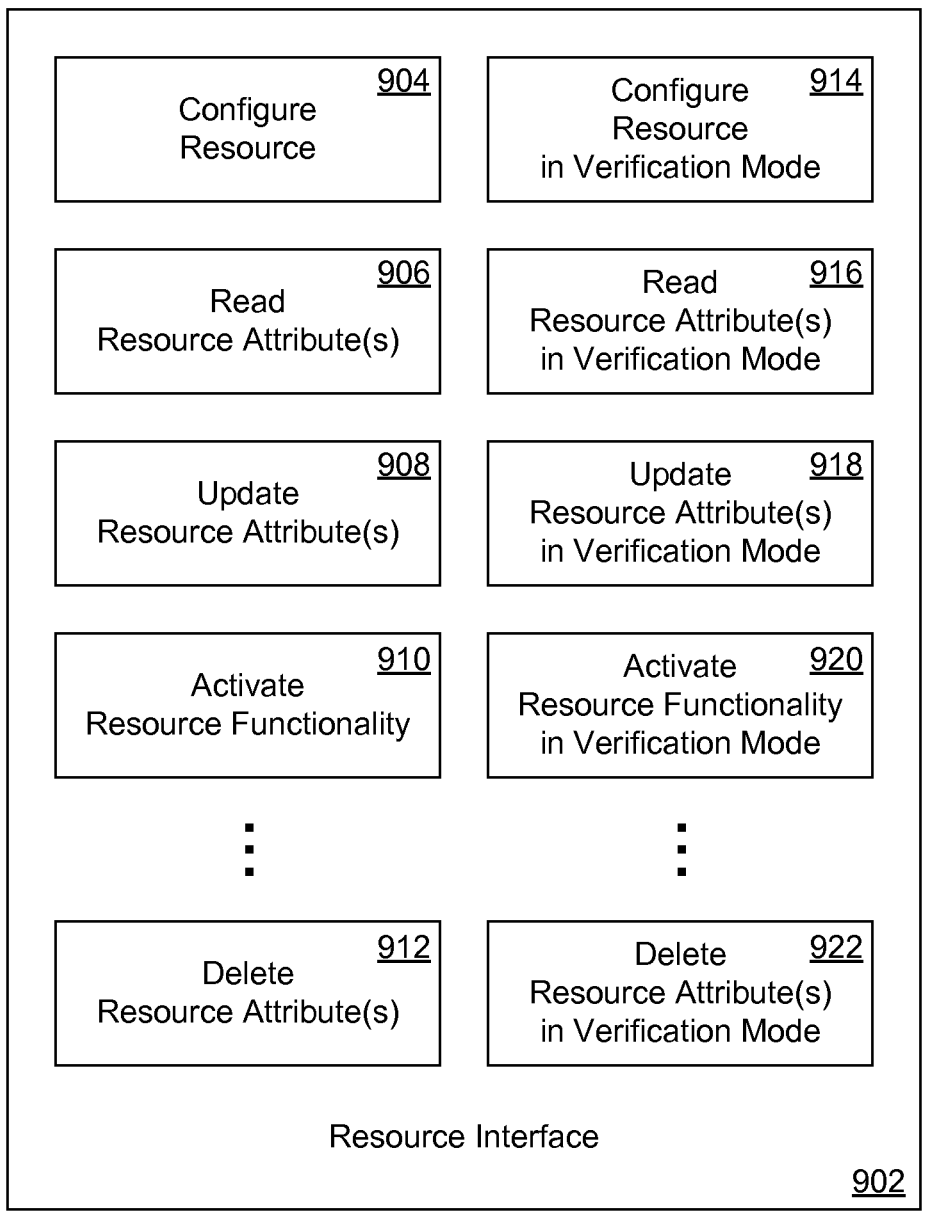
FIG. 9 is a schematic diagram depicting aspects of an example resource interface in accordance with at least one embodiment.

FIG. 9 depicts aspects of an example resource interface 902 in accordance with at least one embodiment. The resource interface 902 may include any suitable number of interface elements of any suitable type. In this example, the resource interface 902 includes a configure resource interface element 904, a read resource attribute(s) interface element 906, an update resource attribute(s) interface element 908, an activate resource functionality interface element 910, and a delete resource attribute(s) interface element 912. In addition, the resource interface 902 includes distinct interface elements 914-922 corresponding to verification mode versions of the interface elements 904-912. Each interface element 904-922 defines a structured interaction with the provisioned resources 812-818 (FIG. 8) including a request to perform a set of actions with respect to at least one of the provisioned resources 812-818. In the example resource interface 902, each interface element 904-922 corresponds to a set of messages of a Web-based services protocol such as extensible markup language (XML) encoded remote procedure calls (e.g., XML-RPC) or a simple object access protocol (e.g., SOAP).

Clients 204-206 (FIG. 2) may utilize the configure resource interface element 904 to request a configuration and/or reconfiguration of one or more of the provisioned resources 812-818 (FIG. 8). For example, if the provisioned resources 812-818 include data object stores, the configure resource interface element 904 may enable clients 204-206 to set a maximum size of a data object store over which they have authority. Clients 204-206 may utilize the read resource attribute(s) interface element 906 to request a read or view of one or more attributes of one or more of the provisioned resources 812-818. For example, the read resource attribute(s) interface element 906 may enable clients 204-206 to obtain copies of specified data objects from specified data object stores. Clients 204-206 may utilize the update resource attribute(s) interface element 908 to request an update of one or more attributes of one or more of the provisioned resources 812-818. For example, the update resource attribute(s) interface element 908 may enable clients 204-206 to update specified data objects and/or create specified data objects in specified data object stores.

Some provisioned resources 812-818 (FIG. 8) may have functionality that can be activated, and the activate resource functionality interface element 910 may be utilized to request an activation of that functionality. For example, some types of data object store may have a capability to analyze stored data objects, and the activate resource functionality interface element 910 may enable authorized clients to start, stop, suspend and/or perform the analysis. The delete resource attribute(s) interface element 912 may enable clients 204-206 (FIG. 2) to request a deletion and/or re-initialization of one or more attributes of one or more of the provisioned resources 812-818. For example, clients 204-206 with sufficient authorization may delete specified data objects from specified data object stores.

In the example resource interface 902, utilization of the verification mode versions 914-922 of the interface elements 904-912 indicates that the corresponding request is to be processed in the verification mode (is a "verification mode request"). For example, the resource interface 828 (FIG. 8) may submit the request to the policy enforcement component 830 as usual, but inhibit any actions that would usually result from a "permit" evaluation result. Regardless of the evaluation result, the resource interface 828 may respond to the request with a verification mode report. For example, the resource interface 828 and/or a controlling workflow may invoke an interface element of the verification mode reporting interface 712 (FIG. 7) to generate the verification mode report. The use of dedicated interface elements 914-922 is only one technique for indicating that a request is to be processed in verification mode. Alternate embodiments may utilize any suitable technique. For example, interface elements 904-912 may incorporate an explicit indicator (e.g., a "flag") for indicating the request is a verification mode request. The resource interface 902 may include an explicit set of interface elements (not shown in FIG. 9) for activating and deactivating verification mode processing. As a further alternative, or in addition, receipt of a verification mode token (e.g., issued by the verification mode service 702) may act as an indication that an associated request is to be processed in verification mode.

Figure 10:
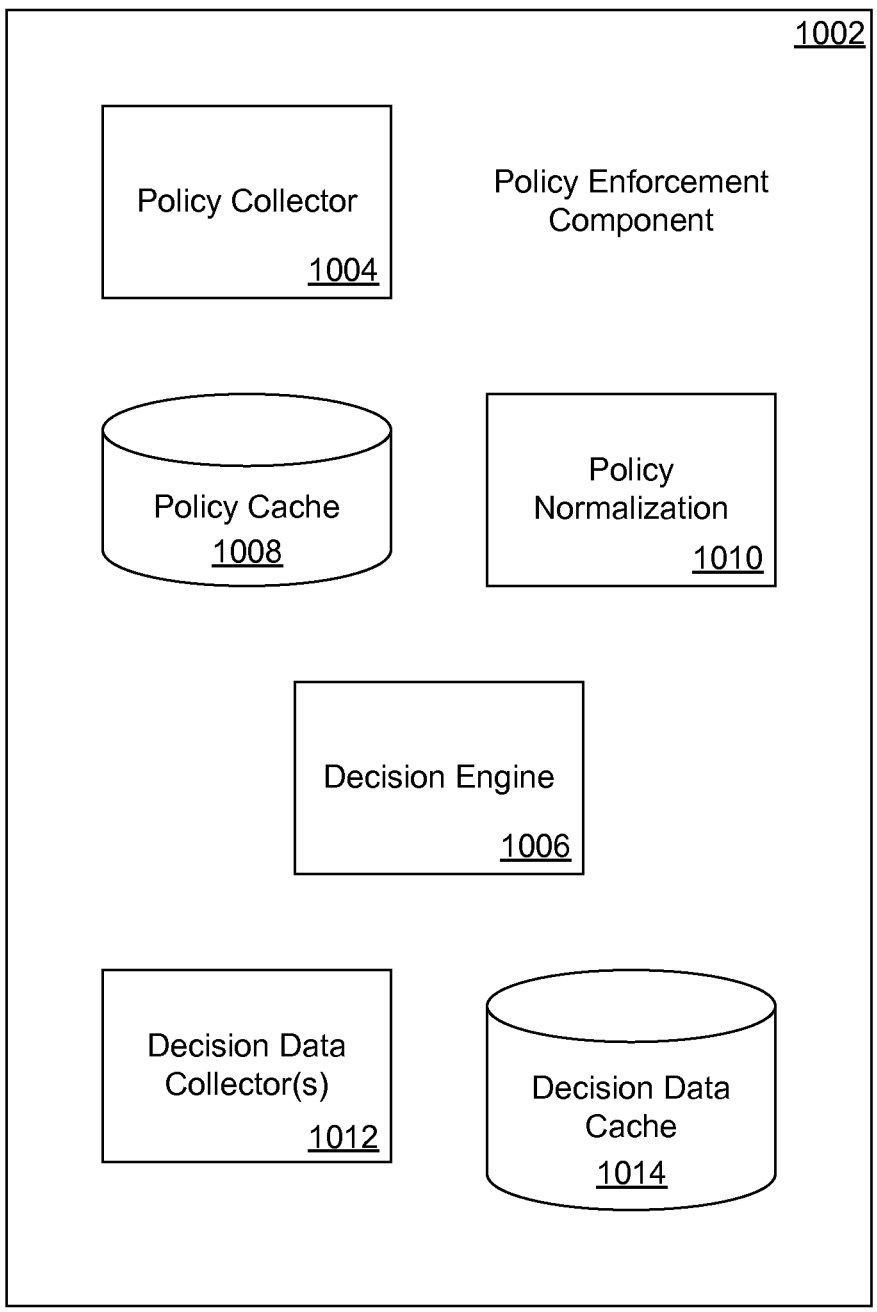
FIG. 10 is a schematic diagram depicting aspects of an example policy enforcement component in accordance with at least one embodiment.

Each interface element 904-922 may correspond to a request (e.g., the request 544 of FIG. 5) subject to a subset of the policies 534-542, 546. In order to evaluate the request with respect to the subset of the policies 534-542, 546, the resource interface 828 (FIG. 8) receiving the request may submit the request to the policy enforcement component 830. FIG. 10 depicts aspects of an example policy enforcement component 1002 in accordance with at least one embodiment. The policy enforcement component 1002 of FIG. 10 is an example of the policy enforcement component 830 of FIG. 8.

The policy enforcement component 1002 may include a policy collector 1004 configured at least to collect relevant policies 534-542, 546 (FIG. 5) from locations throughout the virtual resource provider 502, and store them local to a decision engine 1006 in a policy cache 1008. Collected policies may not be in normal form 402 (FIG. 4). The policy enforcement component 1002 may further include a policy normalization component 1010 having functionality corresponding to that of the policy normalization component 610 (FIG. 6) of the policy management service 602. The policy normalization component 1010 may normalize the set of policies in the policy cache 1008. The decision engine 1006 may evaluate requests submitted to the policy enforcement component 1002 with respect to relevant policies in the policy cache 1008. At times, additional data may be required to support particular decisions with respect to particular policies. The policy enforcement component 1002 may still further include one or more decision data collectors 1012 configured at least to collect the required decision support data ("decision data") from locations throughout the virtual resource provider 502. Collected decision data may be stored local to the decision engine 1006 in a decision data cache 1014.

The policy collector 1004 may update the policy cache 1008 responsive to policy update notifications, for example, received from the policy management service 602 (FIG. 6) and/or the virtual resource servers 804-806 (FIG. 8). The policy collector 1004 may subscribe to notifications of updates to relevant policies and/or policy sets maintained at the policy management service 602 and/or the virtual resource servers 804-806. Alternatively, or in addition, the policy collector 1004 may periodically search for changes to policies in the policy cache 1008 and/or for newly relevant policies.

The decision data collector(s) 1012 may include one or more data collectors configured to interact with the decision data providers 512 (FIG. 5). The decision data collector(s) 1012 may collect decision data responsive to requests by the decision engine 1006, for example, requests by the decision engine 1006 for decision data that is not present in the decision data cache 1014 and/or that is out-of-date. The decision data collector(s) 1012 may furthermore maintain one or more subsets and/or types of decision data in the decision data cache 1014, for example, responsive to update notifications from the decision data providers 512 and/or with updates discovered by periodic searching.

Figure 11:
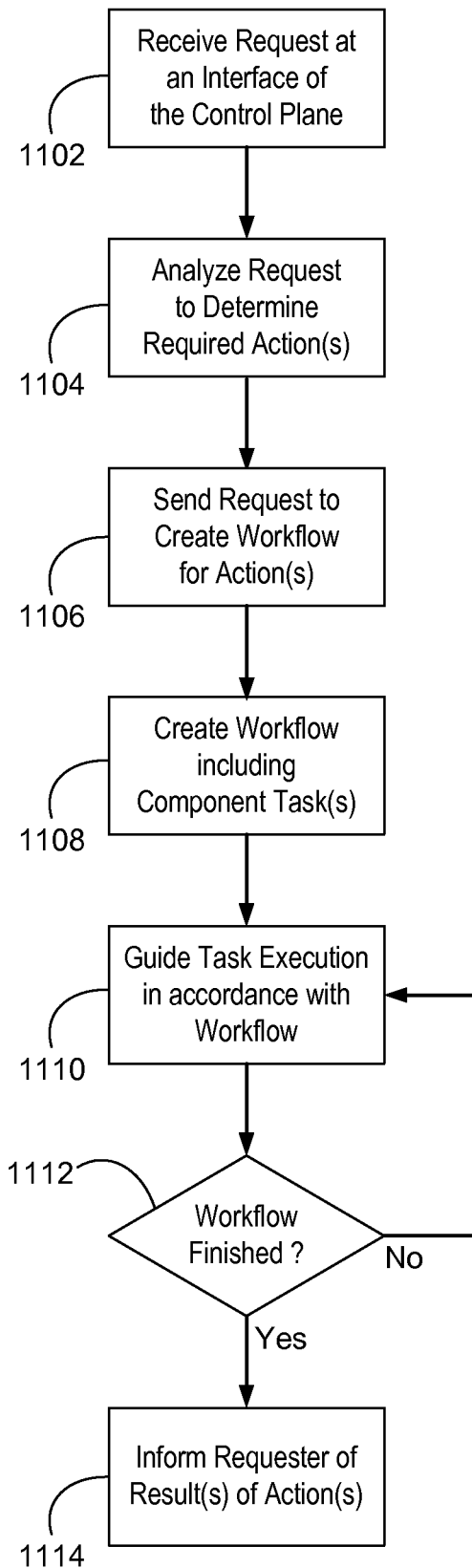
FIG. 11 is a flowchart depicting example steps for workflow management in accordance with at least one embodiment.

As described above with reference to FIG. 3, the control plane 302 may be facilitated by one or more workflows maintained by the workflow management component 322. FIG. 11 depicts example steps for workflow management in accordance with at least one embodiment. At step 1102, a request may be received by an interface of the control plane 302 (FIG. 3). For example, one of the user interfaces 304 of the control plane 302 may receive the request from a user, customer and/or administrator of the virtual resource provider 202. The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 1104, the request may be analyzed to determine one or more actions required to successfully complete the request. For example, the provisioning interface 310 may analyze the request, and determine a set of actions required to provision a set of virtual resources 218-220 (FIG. 2). When an interface element receiving the request corresponds to a specific action to be performed, the interface may extract information from the request to be utilized in determining aspects and/or parameters of the action to be performed.

At step 1106, a request may be sent to create a workflow based at least in part on the one or more actions determined at step 1104. For example, provisioning interface 310 (FIG. 3) may send the request to the workflow management component 322. The request to create the workflow may include the action(s), action metadata such as type of action, and/or action parameters. In at least one embodiment, the control plane 302 and/or the workflow management component 322 maintains a job queue for such requests, and workflows are created responsive to new additions to the job queue. At step 1108, a workflow and one or more component tasks may be created. For example, the workflow management component 322 may analyze the request of step 1106 to determine the appropriate workflow and component tasks to create.

At step 1110, execution of the component task(s) may be guided in accordance with the workflow. For example, the workflow management component 322 (FIG. 3) may activate elements of interfaces of various implementation resources to provision the set of virtual resources. Alternatively, or in addition, the workflow management component 322 may manage bids for execution of the component task(s) by components of the virtual resource provider 202.

At step 1112, it may be determined whether the workflow has finished. For example, the workflow management component 322 may determine whether a final task in a sequence of tasks managed by the workflow has completed. If so, a procedure incorporating step 1112 may progress to step 1114. Otherwise the procedure may return to step 1110 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1114, the sender of the request of step 1102 may be informed of result(s) of the action(s).

Figure 12:
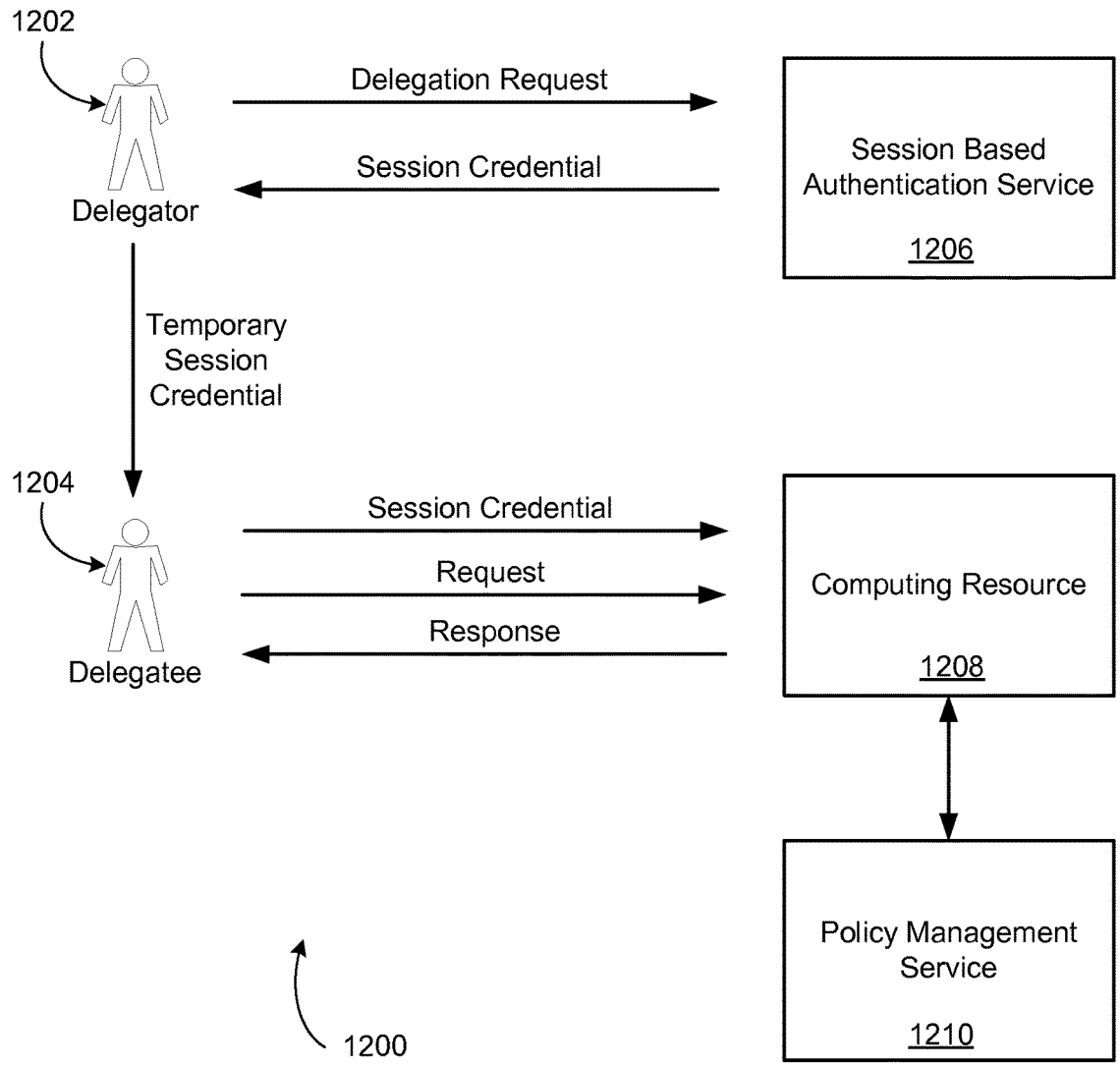
FIG. 12 is a diagram illustrating privileged delegation in accordance with at least one embodiment.

FIG. 12 shows a diagram 1200 of an illustrative example of how information may be exchanged in accordance with an embodiment. Components illustrated in FIG. 12 may utilize the various systems and techniques described above. As illustrated in FIG. 12, a delegator 1202 intends to grant access to one or more computing resources to a delegatee 1204. To do this the delegator submits a delegation request to a session-based authentication service 1206 which may be a service operated by a virtual resource provider, such as described above. The delegation request may be sent using various protocols described herein, such as web service protocols. Further, the delegation request may be any request, collection of requests, or other action or actions that result in a session credential being provided, as described below.

In the embodiment, the session-based authentication service 1206 is a system that generates and provides session credentials. A session credential may be a collection of information that may be used for gaining access to one or more computing resources. In an embodiment a session credential includes a token which encodes the collection of information. The token, in an embodiment, may encode various information such as a user name of the delegator, one or more user names of one or more delegatees, one or more policies specified by the delegator to restrict and/or grant access to one or more delegatees, a time for which the session credential is valid and generally any information that may be useful in various embodiments. The token may also include other information, such as information described above as part of a session credential. The session-based authentication service 1206 or another service acting in concert with the session-based authentication service may encrypt the session credentials so that the session credential is opaque to those who receive it—that is, to any person or machine not having the ability to decrypt the session credential. A session credential may be decrypted as necessary to access information encoded therein. The session-based authentication service 1206 or another service acting in concert with the session-based authentication service may also provide a signing key (as part of the token or separately therefrom) to enable users to sign requests made in connection with a corresponding session credential.

As noted, in response to receipt of the delegation request from the delegator 1202, the session-based authentication service 1206 generates a session credential and provides a session credential to the delegator 1202. The delegator 1202 may then pass the session credential to the delegatee 1204. The session credential may be passed to the delegator or delegatee in any suitable manner. Examples include electronic messages, electronic mail messages and, in some embodiments generally, any method of providing information. The act of providing the session credential to the delegatee from the delegator may be performed outside of a system that incorporates the various components illustrated in FIG. 12. For instance, the delegator 1202 may send the session credential to the delegatee 1204 utilizing an email address of an email account maintained by an entity other than an entity that operates the session-based authentication service 1206. It should be noted that while FIG. 12 depicts the delegator 1202 providing the session credential to the delegatee 1204, the delegatee may receive the session credential in other ways. For example, the session-based authentication service 1206 may provide the session credential to the delegatee 1204 directly. In such an embodiment, the delegator may have specified in connection with the request, information identifying the delegatee that would enable the session-based authentication service 1206 to provide the session credential to the delegatee 1204 accordingly. Also, providing the session credential to a user (delegator or delegatee) may be performed by providing access to the session credential. For instance, a reference to a stored session credential may be provided. Generally the delegatee may receive the session credential in any suitable manner.

As shown in FIG. 12, once the delegatee 1204 has the session credential the delegatee may use the session credential to access a computing resource 1208. A computer resource 1208 may be a computer resource such as those described above, as may include, for example, a virtual machine instance, a virtual storage resource, a physical computing resource, and generally any computing resource, whether physical or virtual. The delegatee 1204 may provide the session credential to the computing resource 1208 in connection with a request to access the computing resource 1208. The session credential may be provided once for each request, once for a plurality of requests, or otherwise. When a delegatee or other user (in FIG. 12 or otherwise herein) provides a session credential, he or she may provide less than all information of the session credential. For example, in an embodiment where a session credential comprises a token and signing key, providing the session credential may include transmitting the token and signing requests with the signing key. In some embodiments, the complete session token may be transmitted when provided.

In response to receipt of the request, the computing resource 1208 may provide a response to the delegatee 1204. The response may be any suitable response. The type of response may generally depend on the situation in which the request was made, and generally the type of request that was made. For instance, if the request was a request to read information from storage, the response may provide such information. The response may also be a response that the request was denied, such as described below. For example, despite having the session credential, a delegatee that provided the session credential may nevertheless not have had the privilege to make the request. The delegatee may have been, by policy for example, prohibited from making the request.

As illustrated in FIG. 12, the computing resource 1208 is in communication with the policy management service 1210 which may operate as the policy management service described above. Generally, the policy management service 1210 may provide the computing resource 1208 a set of policies from which the computing resource 1208 may make decisions on whether to provide requested access. As noted, the session credential may encode one or more policies applicable to a holder of the session credential. Computing resource 1208 may also apply such policies that are encoded in the session of credential and determine whether such encoded policies permit or prohibit the request. The computing resource 1208 may, for example, decrypt the session credential (if encrypted), access any included policies in the session credential and apply the accessed policies when making decisions whether to fulfill requests.

Variations of that which is shown in FIG. 12 are considered as being within the scope of the present disclosure. For example, as illustrated, FIG. 12 shows the delegatee 1204 using a single session credential to gain access to the computing resource 1208. In some embodiments, access may require multiple session credentials, some of which may have been provided pursuant to actions of different delegators. For example, a policy may require multiple delegators to delegate access and a delegatee may be required to provide a session credential from each of the delegators. More complicated schemes with complex conditions may dictate one or more sets of session credentials that may be required for a particular type of access and gaining the access may accordingly require acquisition of multiple session credentials from one or more delegators. Similarly, particular access requested by a delegatee may require privileges that the delegatee has partially received via one session credential and partially received from another session credential. As a simple illustrative example, a delegatee may wish to both read data and delete data in a request. The ability to read data may be delegated to the delegatee via a session credential from a first delegator and the ability to delete may be delegated to the delegatee via another session credential from a second delegator. A successful request to both read and delete may, therefore, involve providing both session credentials.

Figures 13, 14:
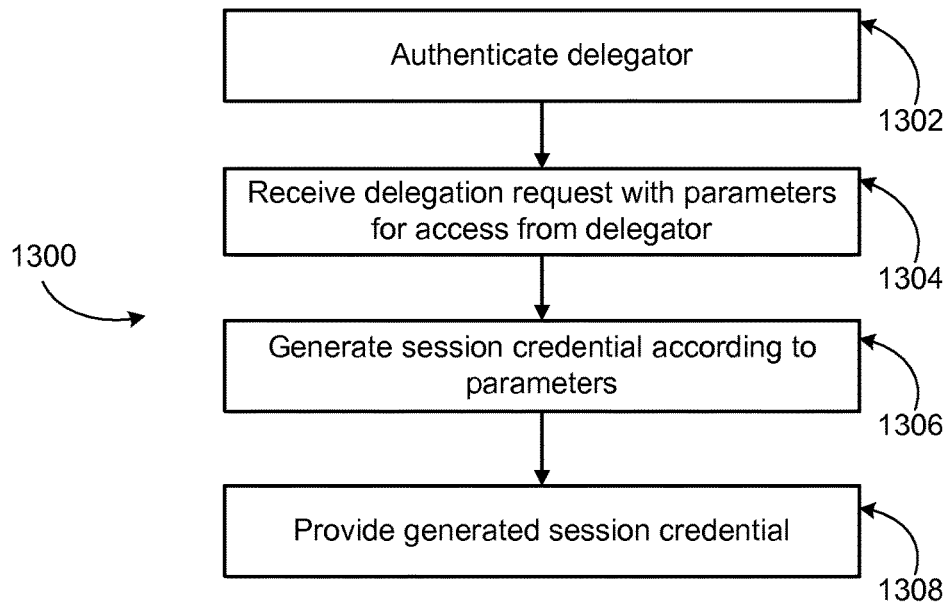
FIG. 13 is a flowchart depicting example steps for providing a session credential in accordance with at least one embodiment.
FIG. 14 is an illustrative example of a graphical user interface for allowing users to request session credentials in accordance with at least one embodiment.

FIG. 13 provides an illustrative example of a process 1300 that may be used to provide a session credential. In an embodiment, the process 1300 includes authenticating 1302 a delegator. Authenticating the delegator may be performed in a manner described above, or generally in any suitable manner using conventional methods for authentication or, generally, any method for authentication. Generally any method which is useable to verify the identity of the delegator may be used. In an embodiment, the process 1300 also includes receiving 1304 a delegation request with parameters for access from the delegator. The delegation request, for example, may be a request that specifies information for a session credential such as described above. The delegation request, for instance, may specify one or more policies, one or more delegatees, a time for a duration of a session to be generated, and/or other information. In response to the request 1304 a session credential may be generated 1306 according to the received parameters. The session credential may be encoded and encrypted such as in a manner described above. Once generated the session credential may be provided 1308. As described above, the session credential may be provided to the delegator that made the delegation request and/or the session credential may be provided to one or more delegatees. Providing the generated session credential may include encoding the generated session credential in an electronic message sent to one or more recipients such as a delegator or one or more delegatees, or it may be performed by making access to the generated session conventional available. Generally the session credential may be provided in any suitable manner.

Additional actions may be performed in connection with the process 1300 or variations thereof. For example, the delegator may authenticate a delegatee using any authentication method, such as an authentication method of the delegator's choice. Authentication by the delegatee to the delegator may be a requirement for delegation to the delegatee. As another example, a delegatee may submit a request for access that triggers an ability for the delegator to grant the requested access. An electronic message, such as illustrated in FIG. 14 discussed below, may be presented to the delegator in response to a delegatee's request for access. The delegator may be required to interact with the electronic access to confirm that the requested access (or access that is different from that which was requested) should be granted.

FIG. 14 shows an illustrative example 1400 of an interface that allows a user to submit a delegation request in accordance with an embodiment. In this particular example, the interface 1400 is to provide a delegation request to allow access to a storage service, which may be a storage service of a cloud storage solution or other storage service. In this example, a user is prompted to confirm that requested should be granted or to select the type of access he or she would like to delegate, if different from what was requested. In this particular example involving a storage service, options provided the user are read, write and/or delete. The choices may be all available choices for a particular computing resource or may be limited in some respect. For instance, the choices may be limited to access that the delegator himself or herself is able to delegate, which may be controlled by policy.

In addition, a session time interface element 1406 of the interface 1400 allows the user to select a time for the session, which may be a duration for which delegated privileges are valid. The time may be used to determine, for example, an expiration time of a session credential generated in response to a request. Once the user has selected appropriate options, a submit button 1404 may be selected by the user to submit the delegation request. Selection of the submit button 1404 may result in an electronic message being sent that includes the parameters set by the user using interface 1400.

It should be noted that the interface 1400 is provided for the purpose of illustration, and generally interfaces that allow users to submit delegation requests can vary greatly from that which is illustrated. For example, interfaces used to submit delegation requests are not necessarily graphical user interfaces. In addition, any options for a delegation request may vary depending on the type of access for which privileges are to be delegated. In an embodiment, users are prevented from granting more access than they themselves actually have. Thus, if a delegator is prevented from performing a particular action in an embodiment, a delegatee of the delegator is also prevented from performing that same action. As will be described in more detail below, various systems may be configured so that the delegatee is not provided more access than is available to the delegator regardless of whether such restrictions are encoded in the session credential.

Figure 15:
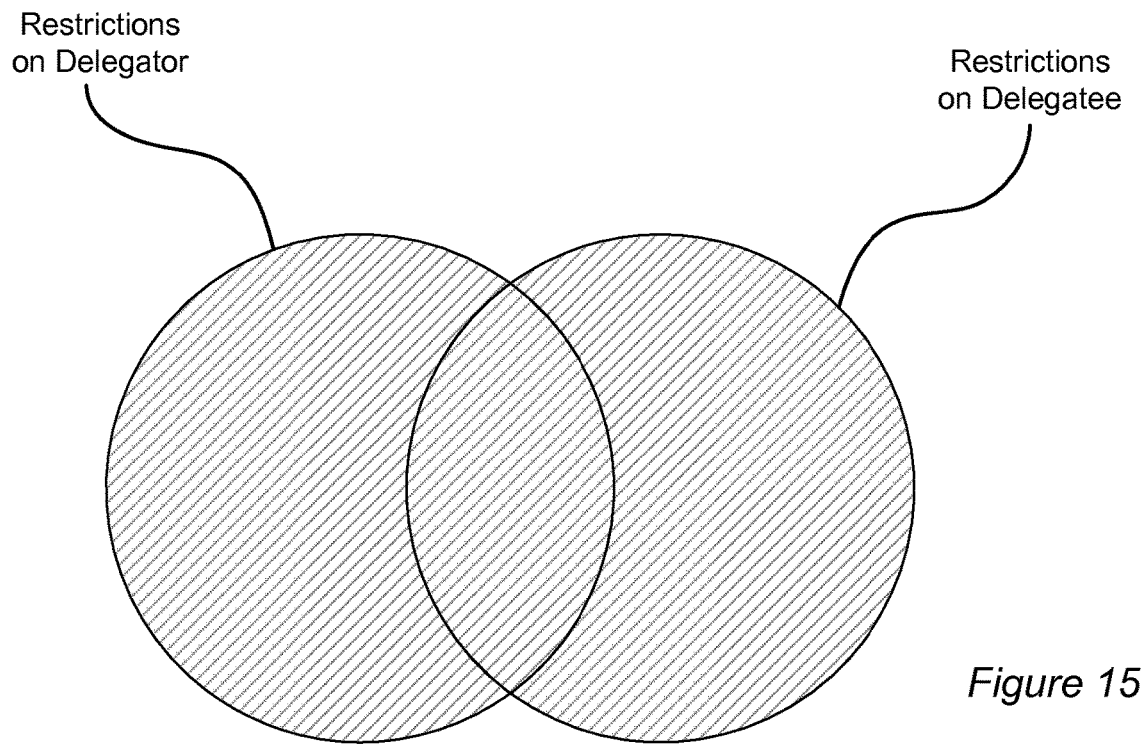
FIG. 15 is a diagram illustrating the scope of restrictions on a delegatee in accordance with at least one embodiment.

FIG. 15 shows a diagrammatic representation of how restrictions on access of a delegator affect the access afforded a delegatee. In particular, FIG. 15 shows a circle representing a set of restrictions on the delegator. The delegator may be restricted from deleting data stored utilizing a data storage service. On the other hand, the delegator may be allowed to read the data stored using the data storage service. Also illustrated in FIG. 15 is another circle representing a set of restrictions on the delegatee. The set of restrictions on the delegatee may be, for example, restrictions encoded in policy in a session credential. FIG. 15 also illustrates the union of the two circles which represent the union of the set of restrictions upon both the delegator and the delegatee. Thus, any restrictions on the delegator would also apply to the delegatee. For example, if the delegator is not allowed to delete files the delegatee would also not be able to delete files even if such a restriction was not encoded by a session credential utilized by the delegatee for access. Thus, the scope of restrictions on the delegatee is at least as large as the scope of restrictions on the delegator. However, in some embodiments, the delegatee may independently have privileges that the delegator does not have and, in such an instance, not all restrictions on a delegator may apply to the delegatee. For example, a delegator may be prohibited from performing delete operations but the delegatee may independently be able to perform delete operations (for example, because policy provides such access to the delegatee but not to the delegator). Thus, even though the delegator is prevented from performing delete operations, the delegatee may still be able to.

Figure 16:
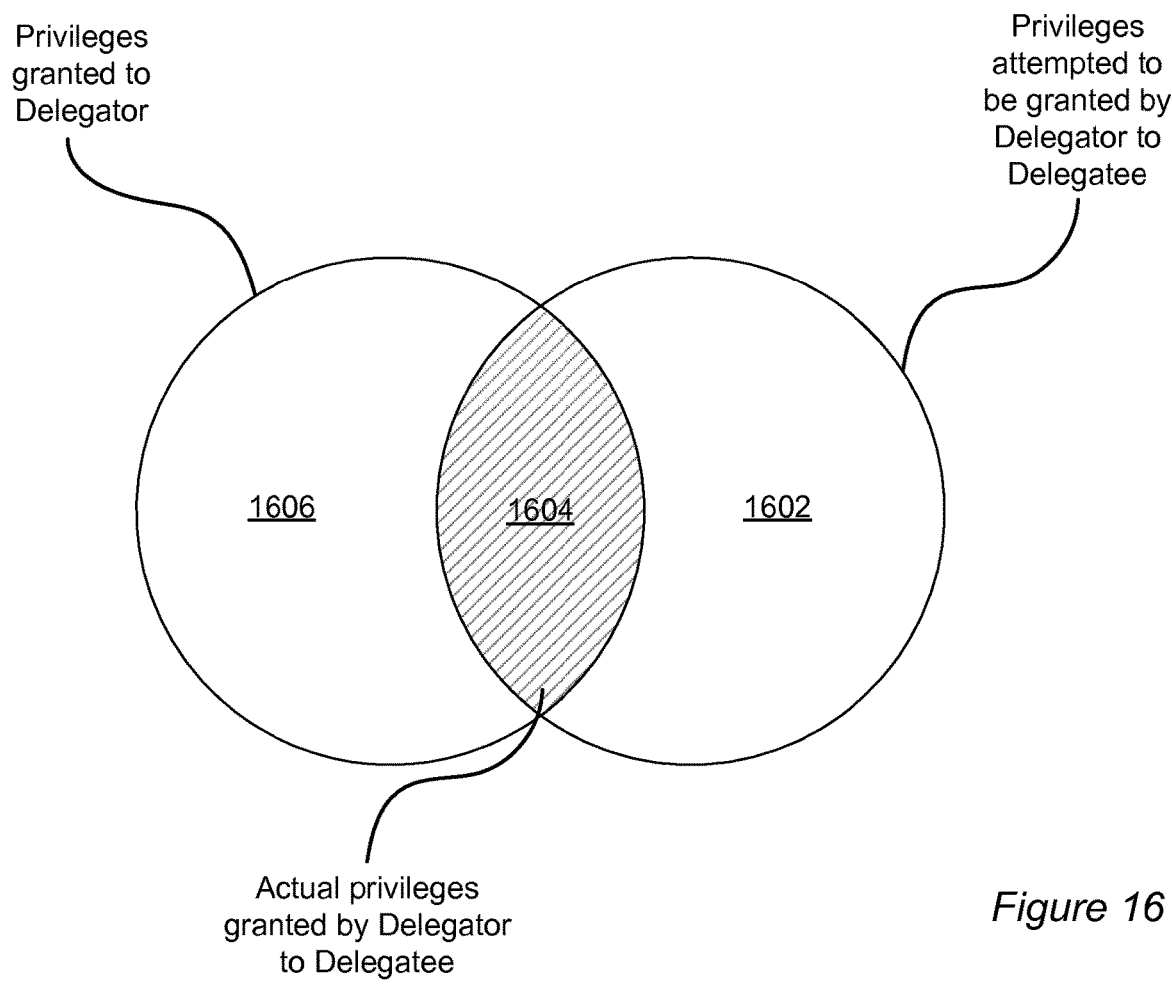
FIG. 16 is a diagram showing the scope of privileges of a delegatee in accordance with at least one embodiment.

FIG. 16 shows a diagrammatic representation that is similar to the representation of FIG. 15. However, in FIG. 16 a first circle represents a set of privileges granted to the delegator. Another circle as labeled represents privileges granted by the delegator to the delegatee. Thus, as represented in FIG. 16, the portion of the circle 1602 outside of the intersection of the two circles represents privileges granted by the delegator to the delegatee that the delegator did not actually have. The delegator, for example, may have submitted a delegation request that specified that the delegatee is able to delete files while at the same time the delegator did not have such a privilege himself or herself. As illustrated in FIG. 16, the intersection 1604 of the two circles represents the actual privileges granted by the delegator to the delegatee. That is, the privileges that were within the scope of privileges of the delegator that the delegator granted. Thus, the privileges that the delegator was actually able to grant are represented by the intersection 1604 of the circles 1602, 1606. In other words, even though the delegator attempted to grant privileges represented by the region inside of the delegatee's circle 1602 but outside of the intersection 1604, only privileges in the intersection 1604 were actually granted by providing the delegatee the session credential.

As noted, in this manner delegators are not able to grant more privileges than they actually have. It should be noted, however, that a delegatee may actually have more privileges than the delegator. The delegatee may actually have one or more privileges that the delegator does not have. Another policy outside of the session credential, for example, may grant such privileges to the delegatee. As one specific example, an employee may submit a delegation request to obtain a session credential that has a restricted set of privileges. If the delegatee granted those privileges to his or her supervisor, the supervisor may nevertheless have a larger set of privileges than the employee that provided the delegation request. In other words, the delegatee may have privileges that were granted independently of a second credential. As noted, in various embodiments, delegator is not able to grant more access than the delegator actually has.

Figure 17:
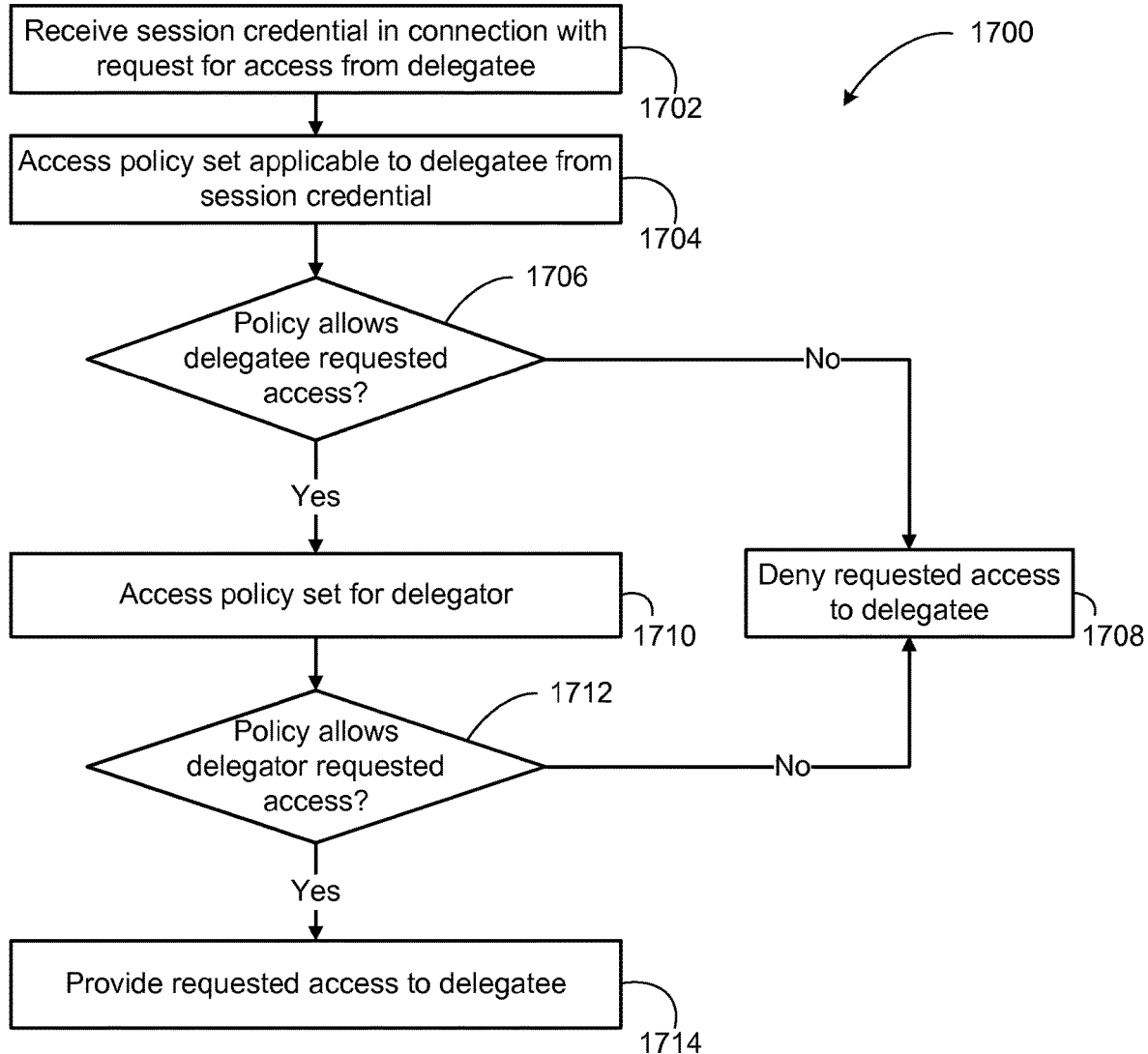
FIG. 17 is a flowchart depicting example steps for providing access to a delegatee in accordance with at least one embodiment.

FIG. 17 accordingly shows an illustrative example of a process 1700 for providing access to a delegatee. Some or all of the process 1700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 1700 includes receiving 1702 a session credential in connection with a request for access from a delegatee. The session credential may be received, for example, by a computing resource for which the request was made. In an embodiment, when the session credential is received 1702 a policy set applicable to the delegatee is accessed 1704 from the received session credential. The session credential, for example, if encrypted, may be decrypted and policy information in the session credential may be identified. A determination may then be made 1706 whether the accessed policy allows the delegatee the requested access. If not, the requested access may be denied 1708. However, if it is determined 1706 that the policy allows the delegatee the requested access, a policy set for the delegator may be accessed 1710. The delegator may have been identified, for example, from the session credential or from information that is used to look up to identify the delegator from a database or other collection of information. Information identifying one or more policies applicable to the delegator may also be encoded in the session credential in some embodiments.

With the policy set for the delegator accessed, a determination may be made 1712 whether the accessed policy allows the delegator the requested access. That is, whether the policy allows the delegator the access that was requested by the delegatee. In this manner, a determination is made whether the delegator was able to grant the access that is being requested by the delegatee. If it is determined 1712 that the policy does not allow the delegator the requested access, then the requested access may then be denied 1708. However, if it is determined 1712 that the policy allows the delegator the requested access, the requested access may be then provided 1714 to the delegatee. If the request for access is a request for information, for example, the requested information may be provided. Similarly, if the request for access was to perform one or more operations, the one or more operations may be performed. Generally, the requested access may be provided to the delegatee in any suitable manner.

Figure 18:
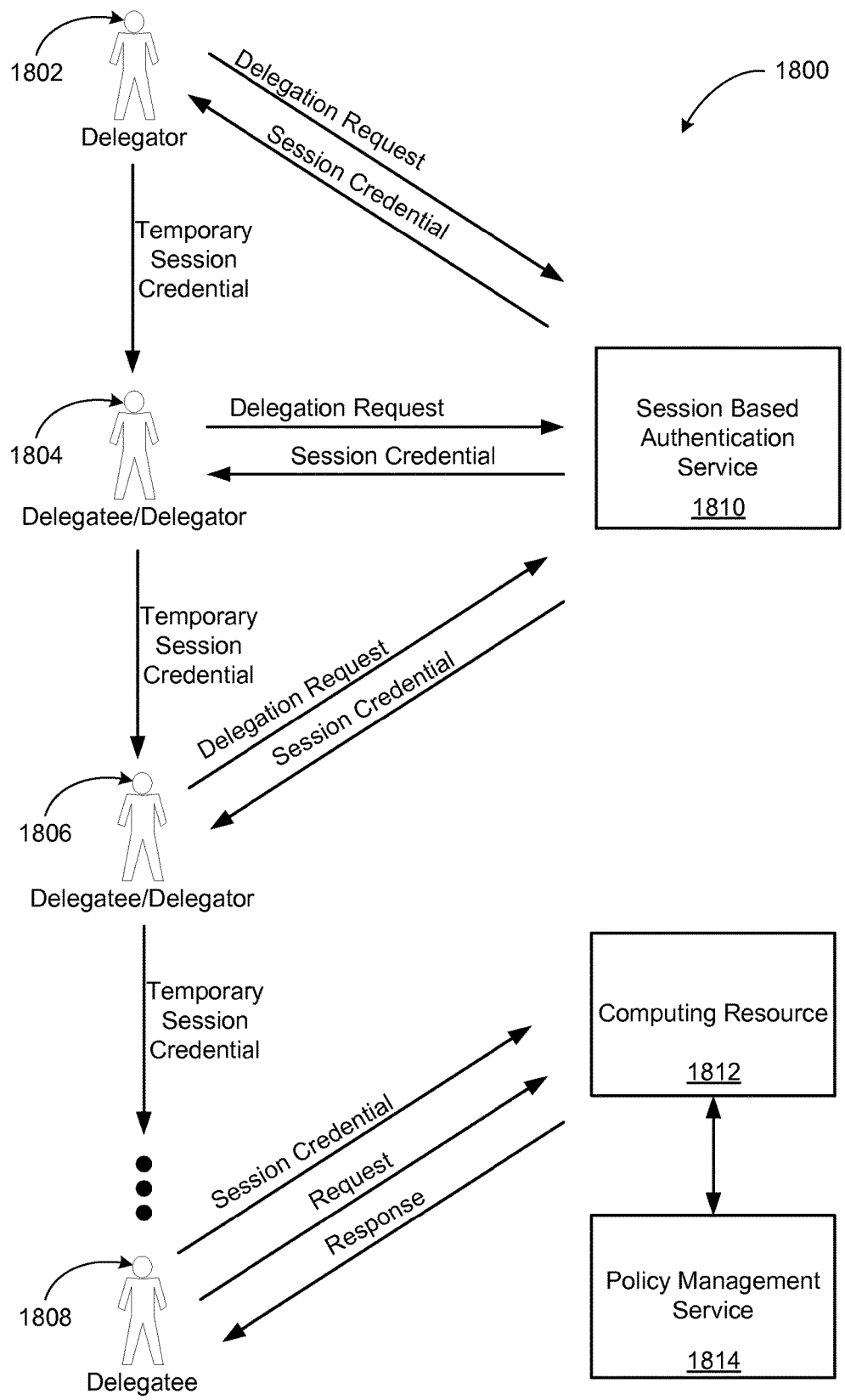
FIG. 18 is a diagram illustrating cascading delegation in accordance with at least one embodiment.

In an embodiment, delegatees are also allowed to delegate privileges to other delegatees. FIG. 18, for example, shows a diagram 1800 illustrating how privileges may be delegated multiple times. The diagram 1800 is in many ways similar to the diagram 1200 described above in connection with FIG. 12. For example, a delegator 1802 may wish to grant one or more privileges to a delegatee 1804. The delegatee 1804, however, in this example, may wish to provide one or more privileges to another delegatee 1806. Thus, in this example, the delegatee 1804 may become a delegator. Similarly, the delegatee 1806 may wish to provide access to another delegatee and that delegatee may wish to grant access to another delegatee and so on until finally one or more privileges are granted to yet another delegatee 1808.

Thus, in this example, the original delegator 1802 submits a delegation request to a session-based authentication service 1810 which may be a session-based authentication service as described above. In response, in an embodiment, the session-based authentication service generates and provides a session credential to the delegator 1802. The delegator 1802 then, in an embodiment, provides the session credential that it received from the session-based authentication service 1810 to the delegatee 1804. The delegatee 1804 may provide the session credential to another delegatee 1806. In this manner the delegatee 1806 would receive the scope of privileges received by the delegatee 1804 that would be the same as the scope of the privileges provided to the delegatee 1806.

However, also illustrated in FIG. 18, the delegatee 1804 may submit a delegation request to the session-based authentication service 1810 and receive a different session credential that had been generated by the session-based authentication service 1810 in response to the delegation request. The delegatee 1804 may provide this new session credential to the next delegatee 1806. The next delegatee 1806 may provide the session credential to yet another delegatee, or as described above may also submit a delegation request to the session-based authentication service 1810 which would then generate a session credential and provide the session credential to the delegatee 1806 that submitted the delegation request. As indicated in FIG. 18, this may continue and one or more of the delegatees may attempt to use a session credential that he or she has received.

In this particular example, a delegatee 1808 provides the session credential to a computing resource 1812 in connection with a request. As above with FIG. 12, the request may include the session credential although the session credential may be provided separately from the request. The computing resource 1812 may be any of the computing resources described above or, generally, any computing resource. Similarly, a policy management service may update policies utilized by the computing resource 1812 such as in a manner described above.

As noted above in an embodiment, delegators are prevented from providing more access than they themselves have. Thus, when there is a chain of delegators and delegatees (which may be a path in a tree of delegation) utilizing session credential(s) to delegate access, the access granted to any given delegatee in the chain in an embodiment does not exceed that of the original delegator. In many instances, the amount of access delegated may reduce as delegation provides from delegator to delegatee. However, as noted above, a particular delegatee may have privileges that are independent of that which is granted by one or more session credentials.

Figure 19:
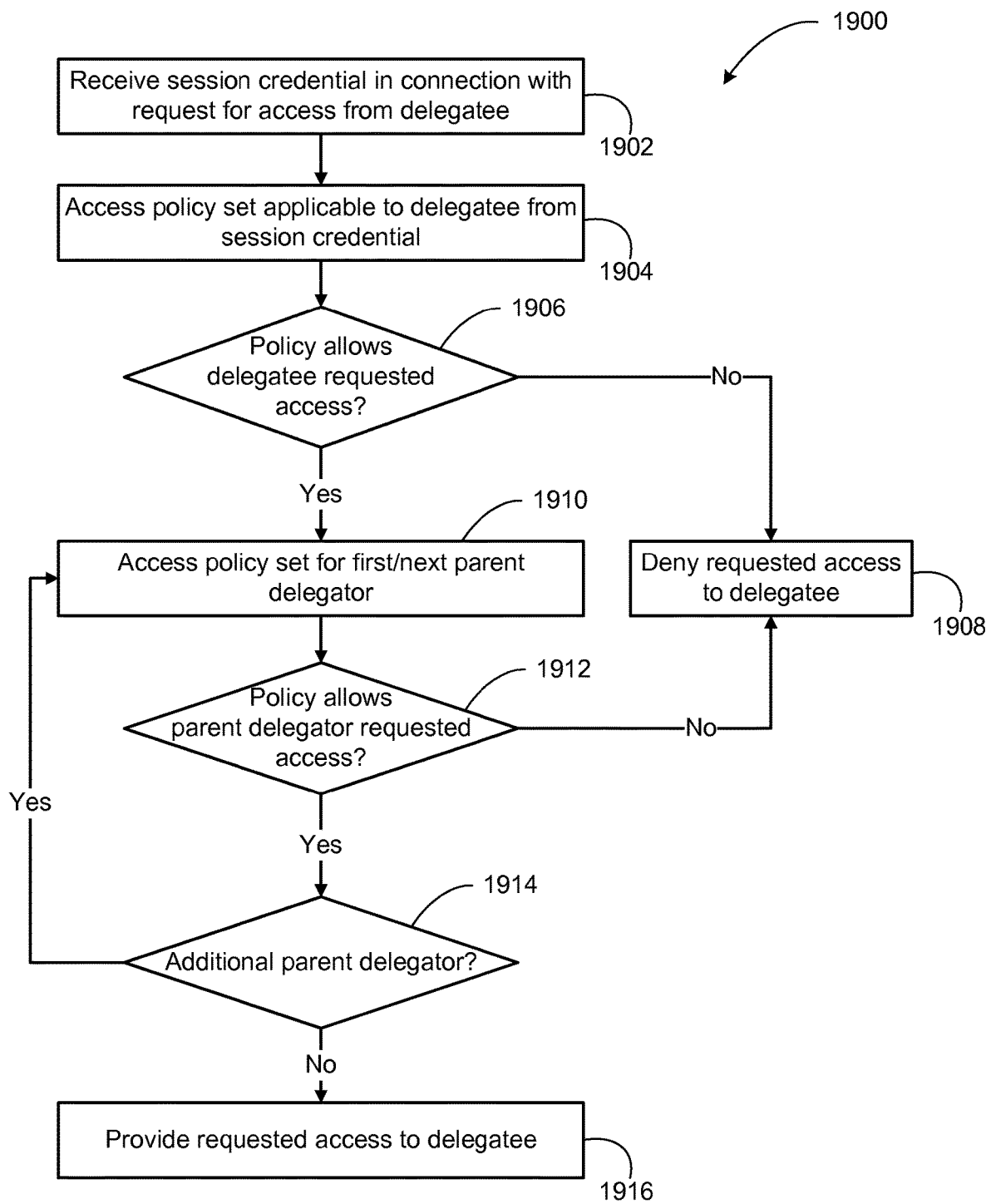
FIG. 19 is a flowchart depicting example steps for providing access to a delegatee in accordance with at least one embodiment.

FIG. 19 shows an illustrative example of a process 1900 for ensuring that a delegatee in a chain of delegators is not granted more access than the original delegator or, generally, any delegators higher in the chain than a delegatee using one or more session credentials in connection with attempting to access one or more computing resources. In an embodiment, the process 1900 includes receiving 1902 a session credential in connection with a request for access from a delegatee.

The session credential may be received such as in a manner described above. In an embodiment, the process 1900 also includes accessing 1904 a policy set applicable to the delegatee from the received session credential. The policy set may be accessed such as in the manner described above. A determination may then be made 1906 as above whether policy allows the delegatee the requested access and, if not, the requested access may be denied 1908. However, if it is determined 1906 that policy does in fact allow the delegatee the requested access, then a policy set for the first parent delegator of the delegatee is accessed 1910. A parent delegator may be a delegator that submitted the delegation request for which the session credential was generated. For example, referring to FIG. 18, the delegator 1802 is a parent delegator to the delegatee 1804. Similarly, the delegatee 1804 is a parent delegator to the delegatee 1806.

Returning to FIG. 19, a determination may be then made 1912 whether policy allows the parent delegator the requested access and, if not, the requested access may be denied. The determination whether the policy allows a parent delegator requested access may be made in any suitable way. For example, policy information stored by a computing resource may be checked for the delegator. Similarly, when a session credential is used in connection with a delegation request to generate another session credential, any policy applicable to the delegator that is in the session credential used for the request may be encoded in the new session credential that is generated. In other words, a session credential may encode policy information for multiple delegators in a chain. Similarly, information identifying the delegator may be encoded in the session credential and subsequently encoded in another session credential.

If it is determined the policy allows the parent delegator the requested access, a determination may be made 1914 whether there are additional parent delegators. For example, in an embodiment, information identifying delegators in a chain may be encoded by a session credential and such information may be used in making the determination whether there are additional parent delegators. Information identifying delegators in a chain may also be stored outside of a session credential and checked. If it is determined that there are additional parent delegators, the policy set for the next parent delegator may be accessed 1910 and a determination be made 1912 whether that parent delegator is allowed the requested access by policy. If the requested access would not have been allowed to the parent delegator, then the requested access may be denied 1908 and if the requested access would be allowed, then the determination may be made 1914 whether there are additional parent delegators. This process may continue until it is determined that there are no additional parent delegators. When determined that there are no additional parent delegators (which, in this illustrative example, corresponds to no parent delegators being determined to be prohibited from the requested access), the requested access may be provided 1916 to the delegatee that submitted the request for which the process 1900 is being performed.

As noted, the various techniques described and suggested herein allow access to one or more computing resources to be delegated in a manner that prevents any particular delegator from actually providing more access than he or she actually has. In addition, the techniques described and suggested herein allow a convenient mechanism for revocation of access from one or more delegatees. As noted above in connection with FIG. 19, policies in connection with session credentials in an embodiment are late finding. That is, policy is checked at the time a request for access to a computing resource is made. In this manner, access to a delegatee that has been granted may be revoked by revoking such access from a delegator.

As with any process described herein, variations are considered as being within the scope of the present disclosure. For example, FIG. 19 shows a process in which policy sets applicable to delegators in a chain of delegation are sequentially checked. However, in other embodiments, ensuring that no delegator delegated more access than he or she has may be performed in various ways. For example, all delegators in a chain may be initially identified and applicable policy sets may be accessed accordingly. Determining whether to provide a delegatee requested access may be performed by checking the combination of accessed policy sets. As another example, as discussed, a delegatee/delegator in a chain of delegation may himself or herself have more privileges than a delegator higher in the chain. A process, such as the process 1900, may be modified accordingly to take into account that a delegatee/delegator may have privileges in addition to any privileges provided via one or more session credentials. For example, a process may provide access to a delegatee upon determination that a delegator (regardless of position in a chain) independently was able to delegate the access and, in fact, such access was delegated to the delegatee (e.g., another delegator below the delegator in a chain did not limit such access when delegating).

Figure 20:
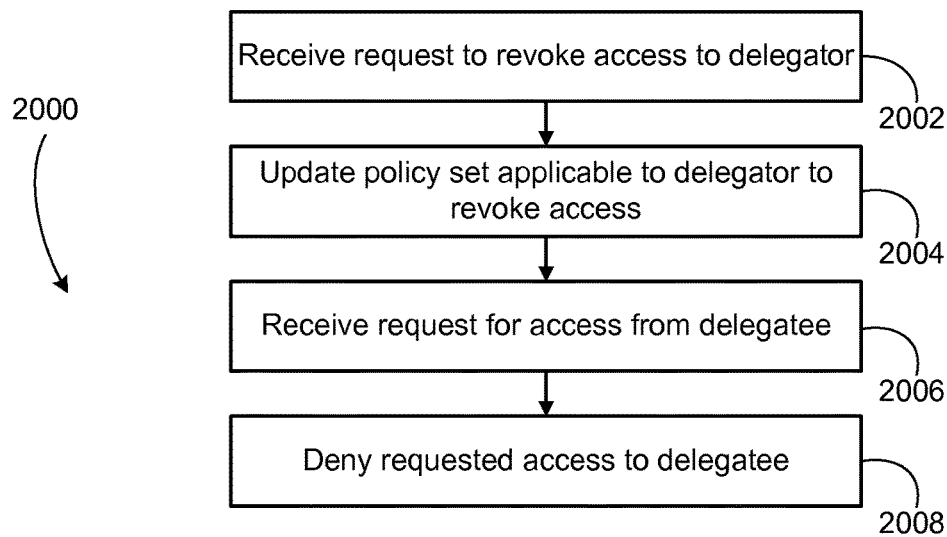
FIG. 20 is a flowchart depicting example steps for revoking access to a delegatee in accordance with at least one embodiment.

Embodiments of the present disclosure provide for a convenient mechanism for revoking access that has been delegated using one or more session credentials. FIG. 20 accordingly shows an illustrative example of a process 2000 that may be used to revoke access to a delegatee. Generally, in embodiments employing late binding semantics, access to a delegatee may be revoked by revoking appropriate privileges of a delegator. In this manner, when a check is made whether the delegator was able to delegate access (e.g. whether the delegator himself or herself had privileges to the access that has been requested by the delegatee), it may be determined that the delegator was not able to delegate the requested access and, therefore, access to the delegatee may be denied.

In an embodiment, the process 2000 includes receiving 2002 a request to revoke access to a delegator. While described herein as a request to revoke access to a delegator, the request may be a request to revoke access to a delegatee. In an embodiment, a policy set applicable to the delegator is updated 2004 to revoke access to the delegator. The policy set may be updated in a policy management service or at a computing resource, or in any other suitable manner. In an embodiment when a request for access from a delegatee is received 2006, a process for checking whether the delegatee has rights to the requested access may be checked. A process, for example, such as the process 1900 described above in connection with FIG. 19 may be performed. Accordingly, the requested access may be then denied 2008 to the delegatee when, even though a session credential may indicate that the delegatee has such access and at some point such access was actually delegated, the delegator does not have access at the time of the request. In an embodiment, the rights to delegate access is itself a right that may be controlled by policy. Thus, in connection with processes such as the process 1900 described above in connection with FIG. 19, if a delegator did not actually have a right to delegate access checking, the policy applicable to the delegator would indicate such and access to a delegatee may be denied accordingly. However, policy may be checked during processes for generating session credentials.

Figure 21:
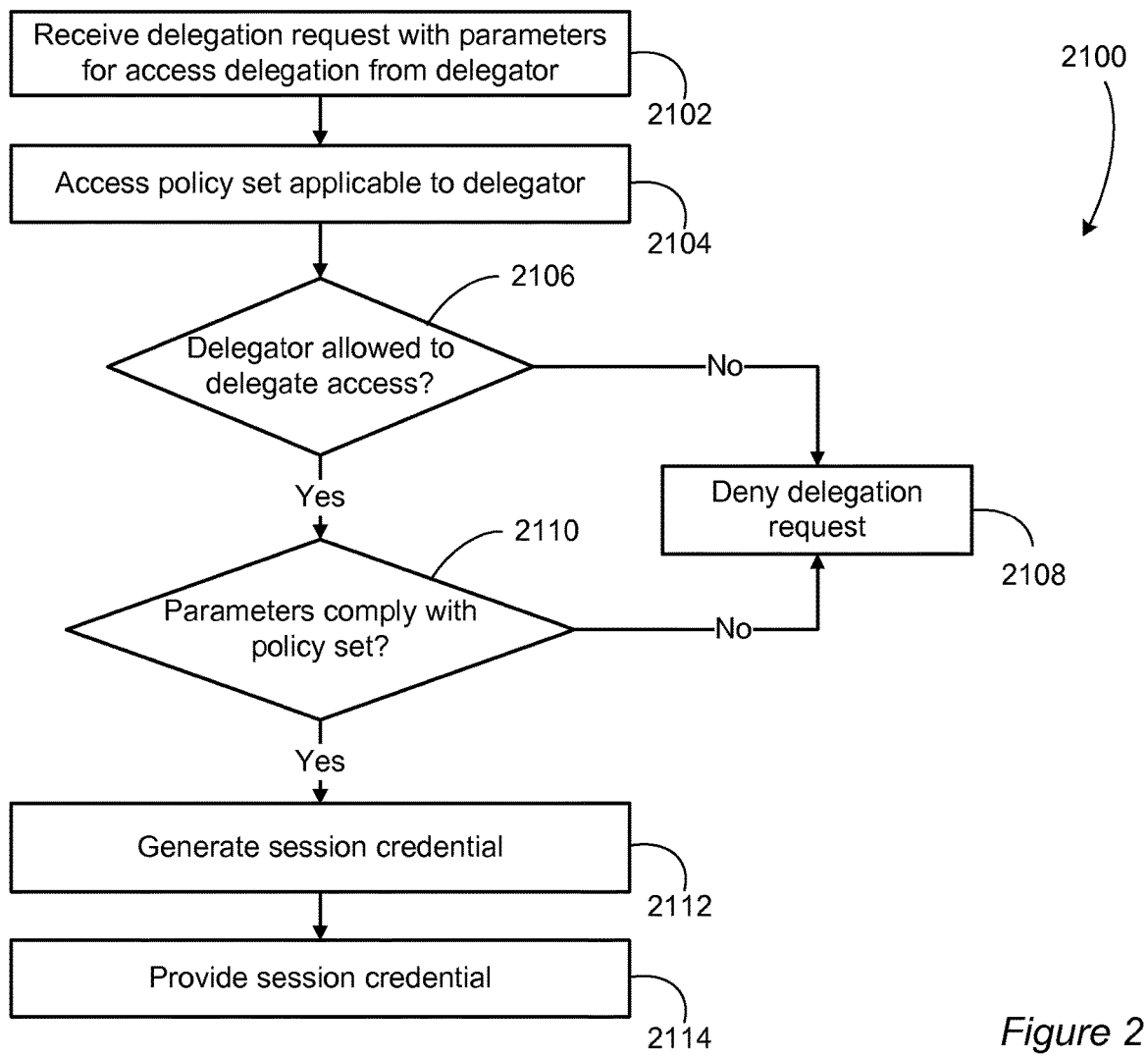
FIG. 21 is a flowchart depicting example steps for providing a session credential in accordance with at least one embodiment.

As noted, in some embodiments, a delegator is able to cause a session credential to be generated that indicates access that the delegator cannot actually delegate, for example, because he or she does not have the access himself or herself. In other words, a session credential may be generated that incorrectly indicates that certain access has been delegated. In this manner, the delegator does not need to keep track of his or her privileges. However, in some instances, it may be desirable to prevent users from generating such credentials. In an embodiment, generation of such session credentials may be at least sometimes avoided by checking policy at the time of session credential creation. FIG. 21, accordingly, shows an illustrative example 2100 of how policy may be checked in order to determine whether to generate and provide a session credential.

In an embodiment, the process 2100 includes receiving 2102 a delegation request with parameters for access delegation from a delegator. A policy set applicable to the delegator may then be accessed 2104. The delegation request, receipt thereof, and access of the policy set may be performed in a manner such as described above. In an embodiment, a determination is made 2106 whether the delegator is allowed to delegate access. If a delegator is not allowed to delegate access, then the delegation request may be denied 2108 and a session credential may not be generated. Determining whether the delegator is allowed to delegate access may be performed by checking the access policy applicable to the delegator. If it is determined 2106 that the delegator is, in fact, allowed to delegate access, then in an embodiment a determination is made 2110 whether the parameters of the delegation request comply with the accessed policy set. As one example, if the parameters indicate that a delegatee would be able to delete files, yet the delegator does not have the right to delete files, then a determination may be made that the parameters do not comply with the policy set. If the determination 2110 is that the parameters do not comply with the policy set, then the delegation request may then be denied 2108 (or a session credential may be created according to the access that the delegator actually has, which may be less than specified in the delegation request). If, however, the parameters do, in fact, comply with the policy set, then a session credential may then be generated 2112 and the session credential may be provided 2114 such as in a manner described above.

Figure 22:
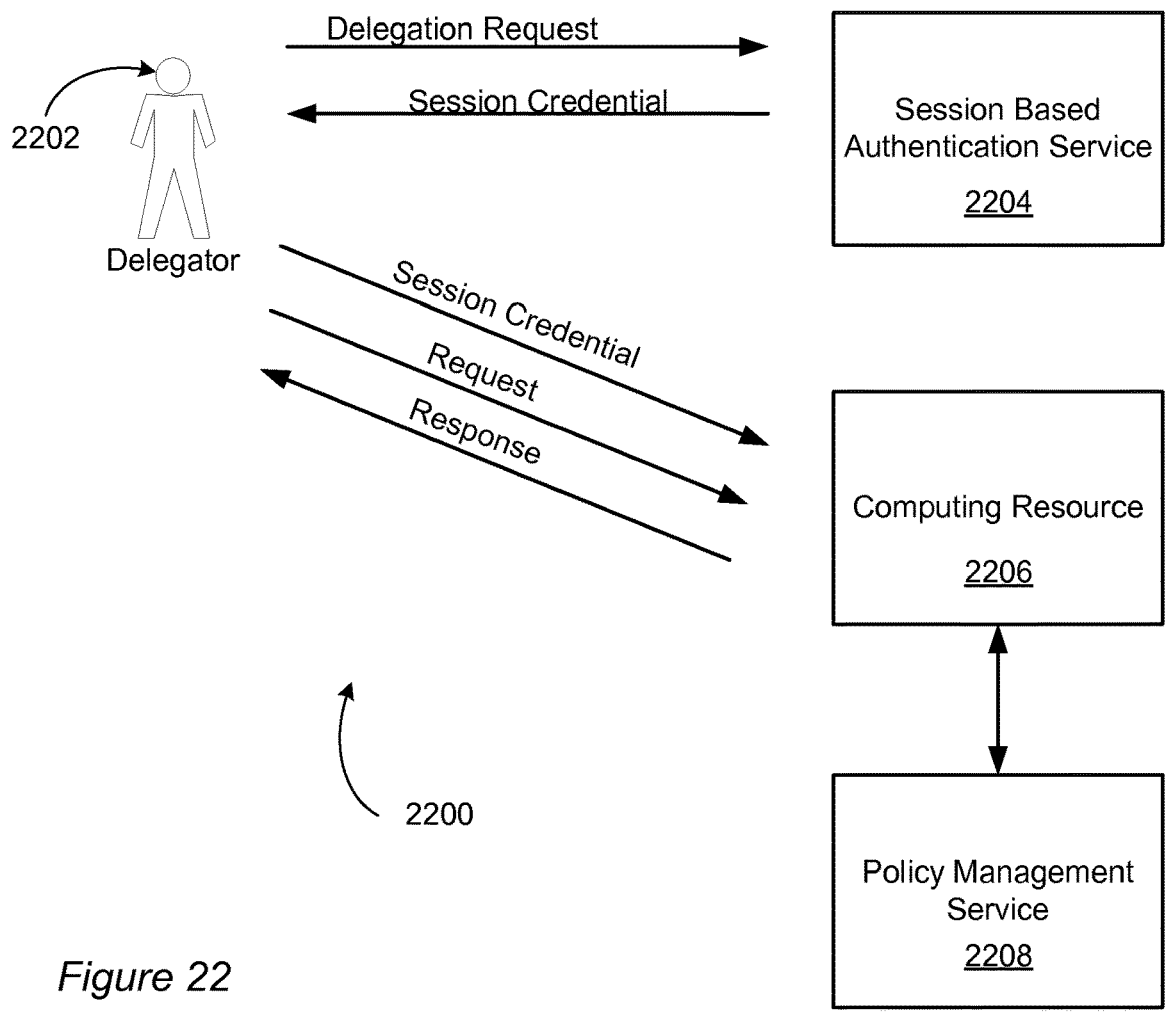
FIG. 22 is a diagram depicting access to a computing resource by a user in accordance with at least one embodiment.

It should be noted that techniques of the present disclosure are also applicable in situations where access is not necessarily delegated. Such situations may be thought of, for example, as the delegator delegating to himself or herself. A delegator may, for instance, have certain privileges upon authentication but may be required to obtain additional privileges to gain additional privileges. As a security measure, for example, certain operations may require additional authentication which may be valid for a short period of time. FIG. 22 provides an illustrative example of a diagram 2200 illustrating how a user may delegate access to himself. In FIG. 22 a delegator 2202 submits a delegation request to a session-based authentication service 2204 which may be a session-based authentication service such as described above. Submission of the delegation request may involve the delegator completing an authentication process, which may be additional to an authentication process that the delegator has already completed. Submission of the delegation request may also involve submission of a session credential that the delegator has obtained, although the delegator may submit the delegation request without such a session credential in some embodiments. In other words, the delegator may be a delegatee that is using an obtained session credential to obtain another session credential.

The session-based authentication service 2204 may, in response to the delegation request, generate a temporary session credential and provide the temporary session credential to the user 2202. The user 2202 may utilize the received session credential to access a computing resource 2206 which has policy updated by a policy management service 2208 in accordance with the above description. The user 2202 may, for example, utilize the session credential in the same way that the delegatees described above may utilize session credentials. The processes described above may also be applicable. As depicted in FIG. 22, for example, the user 2202 submits a session credential to the computing resource 2206 in connection with a request made to the computing resource 2206. The computing resource 2206 may utilize the session credential in determining whether or not to provide access to the user 2202. A response may be transmitted from the computing resource 2206 to the user 2202 as described above. The computing resource 2206 may verify that the user 2202 has a right to the requested access by analyzing policy encoded in the session credential and in policy otherwise accessible to the computing resource 2206. In this manner, processes described above are performed as if the delegatee and delegator are the same person which, in this case, they are.

Use of a session credential such as illustrated in FIG. 22 may be advantageous in various situations, such as when a user authenticates himself or herself to a system but needs further authentication in order to gain additional access. The user (delegator), for example, may authenticate himself or herself to a storage service computing resource. Authentication by itself may allow the user to read information that is performed read operations in connection with information stored using the storage service. A policy, however, may state that deleting any files that are stored using the storage service must require additional authentication such as multi-factor authentication which may utilize various additional authentication techniques such as biometric techniques, SecureID authentication methods utilizing services provided by RSA Security, a division of EMC Corporation, and/or other techniques. In this manner a session token of a session credential may encode a type of authentication utilized by a user to authenticate himself or herself in order to avoid the user having to authenticate himself using that type of authentication additional times.

Figure 23:
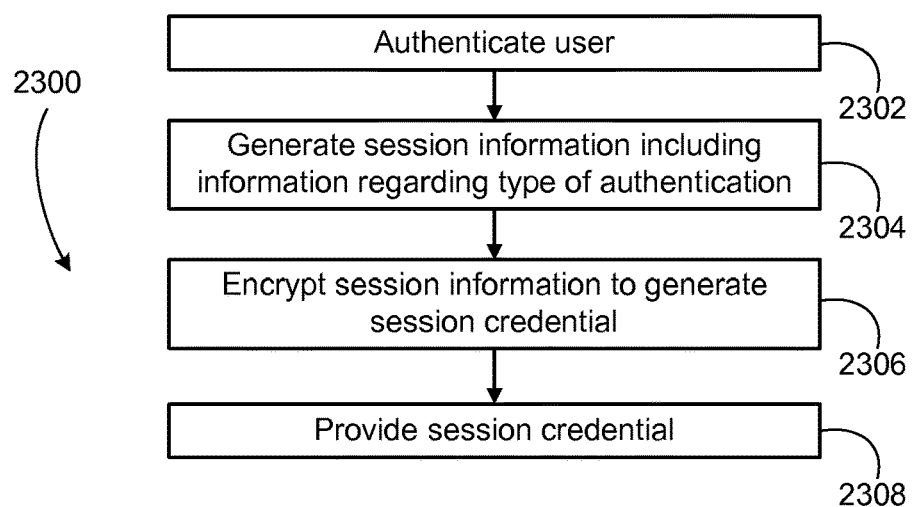
FIG. 23 is a flowchart depicting example steps for providing a session credential in accordance with at least one embodiment.

FIG. 23 shows an illustrative example of a process 2300 for providing a session credential to a user. The session credential may be a token or other collection of information, such as described above. The session credential may, for example, encode various information such as policy information, user identity information and as described herein, information indicating one or more methods of authentication utilized by the user, and other information. In an embodiment, the process 2300 includes authenticating 2302 the user. Any authentication method may be used. Suitable authentication methods include, but are not limited to, requiring the user to provide a user name and identity. RSA authentication utilizing RSA secure ID technology authentication requiring one or more biometric tests and generally any form of authentication. In an embodiment, session information, including information regarding the type of authentication, is generated 2304. As noted, the session information may include information regarding policies applicable to the user and/or any delegatees, user identity information and other information. In an embodiment, the session information includes one or more claims identifying an action taken by the user and/or one or more attributes about the user. Claims, attributes, and the like for the session information may be provided by a service and/or may have been provided by the user him or herself. The generated session information may be encrypted 2306 to generate a session credential and the session credential may be provided 2308 to the user (such as in a session credential). For example, the session credential may be provided to a computing resource or any system that may utilize the session credential.

Figure 24:
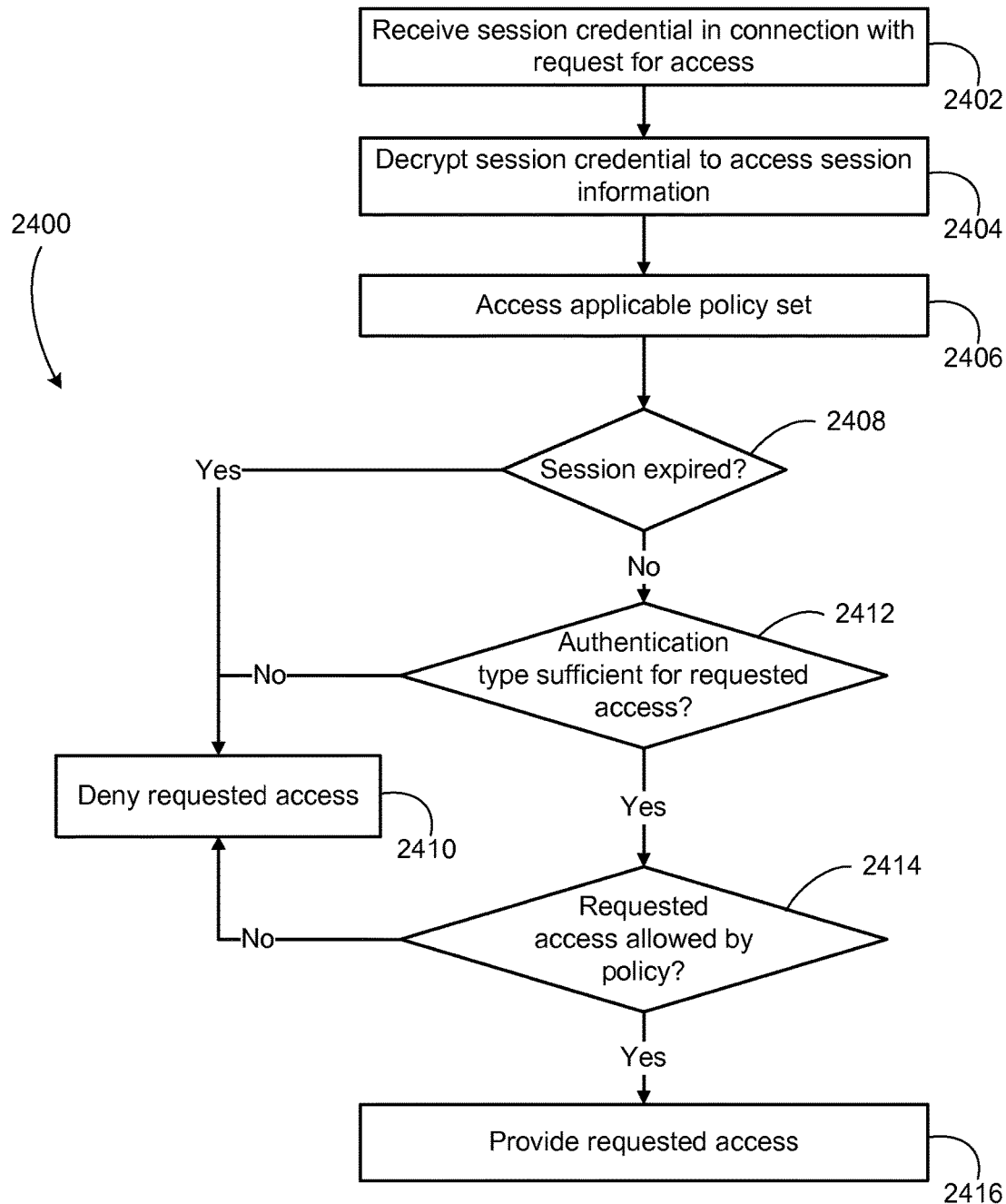
FIG. 24 is a flowchart depicting example steps for providing access to a user that has provided a session credential in accordance with at least one embodiment.

As noted above, the type of authentication that was required of a user may be important for accessing a computing resource. FIG. 24 accordingly shows an illustrative example of a process 2400 for providing access to a user that takes into account information regarding the user's authentication state (e.g. if and how the user authenticated himself). In an embodiment, a session credential is received 2402 in connection with a request for access. The session credential may be received in any suitable manner such as in the manner described above. The received session credential may be decrypted 2404 to access the session information of the session credential. An applicable policy set may be accessed 2406 from the accessed session information and/or from other locations, such as described above.

In an embodiment, a determination is made 2408 whether a session of the session credential has expired and, if the session has expired, then requested access may be denied 2410. If, however, the session is not expired a determination may be made 2412 based at least in part on the accessed session information and policy information whether the authentication type indicated in the session information is sufficient for the requested access. If the authentication type is insufficient for the requested access, the requested access may be denied 2410. If, however, the authentication type is in fact sufficient for the requested access, then a determination may be made 2414 based at least in part on the policy information whether the requested access is allowed by policy. If the requested access is not allowed by policy the requested access may be denied and if the requested access is allowed by policy, the requested access may be provided 2416 as described above.

Figure 25:
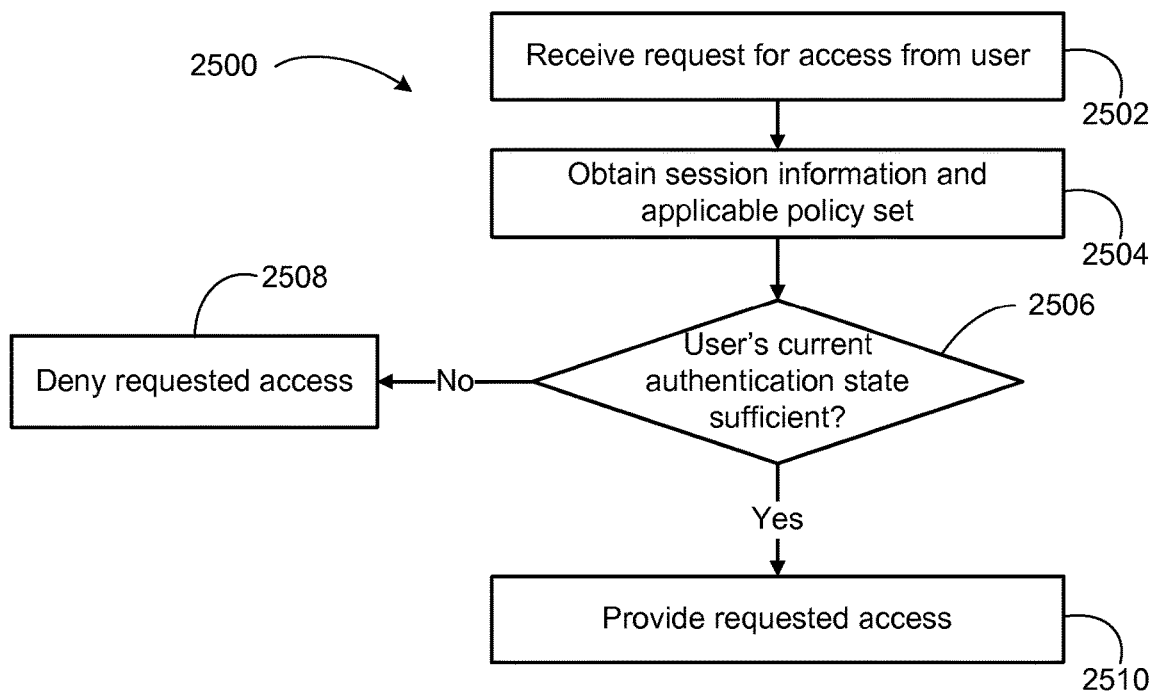
FIG. 25 is a flowchart depicting example steps for providing access to a user in accordance with at least one embodiment.

As noted, various information about what a user has done to authenticate himself or himself may be encoded in a session credential. Accordingly, FIG. 25 shows an illustrative example of a process 2500 that may be used in such instances. In an embodiment the process 2500 includes receiving 2502 a request for access from a user. Such information and the applicable policy set may be obtained 2504, such as in the manner described above. For example, the user may have provided a session credential in connection with the request that was received. In an embodiment, a determination is made based at least in part on the session information and the applicable policy set whether the user's current authentication state is sufficient and if the current authentication state is insufficient the request for access may be denied 2508.

As a specific example, the request may have been a request to perform an operation in a set of data. A policy applicable to such an operation may indicate that such an operation can only be made when a user having authority to perform the operation has authenticated himself or herself using a particular form of authentication in a certain amount of time, such as ten minutes. The operation may be, for example, deleting information that is stored using a storage service computing resource. Such a policy may be in place to prevent inadvertent and/or malicious deletion of information. If it is determined 2506 that the user's current authentication state is sufficient the requested access may be provided 2510 such as in a manner described above. As noted, when policy indicates that the request for access cannot be performed, requested access may be denied.

Figure 26:
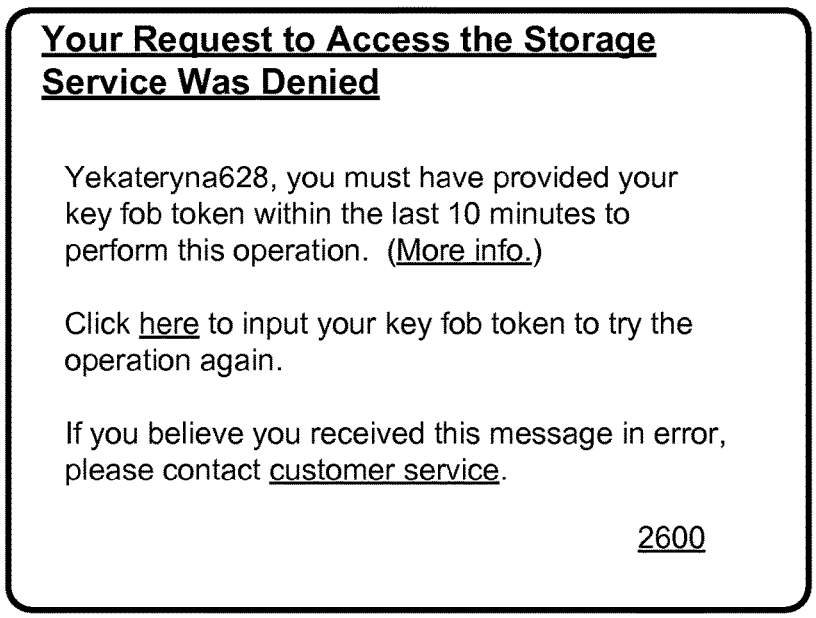
FIG. 26 is an illustrative example of a message indicating that a request for access has been denied in accordance with at least one embodiment.

FIG. 26 accordingly shows an illustrative example of one way of denying requests for access. In this particular example, the requested action has not been performed and an electronic message may be transmitted and a representation of the electronic message on an interface 2600 is provided to the user. In this particular example, the message to the user gives hints about why the request was denied. In this example, the information indicates that the user must have provided a key fob token within the last ten minutes to perform the operation that was requested. Various interface elements shown in underline may be selectable in order to provide the user more information and/or to correct any deficiencies that resulted in the request being denied.

Various techniques described herein are also applicable in other instances. A virtual resource provider (or generally any computing resource provider), for example, may charge customers based on various actions performed by a customer. For example, the transformation of information to and from a virtual resource provider, or generally any resource provider, may be charged according to the amount of information being sent. Any aspect of a computing environment may be measured and utilized as the basis for charging customers of the resource provider. In this manner it may be important for customers to be careful about how they utilize resources of a resource provider in order to avoid excess charges. A policy in place may, for example, indicate that certain employees are only able to incur charges of a certain amount. A policy may be applicable to all employees or to possible lower level employees.

Figures 27, 28:
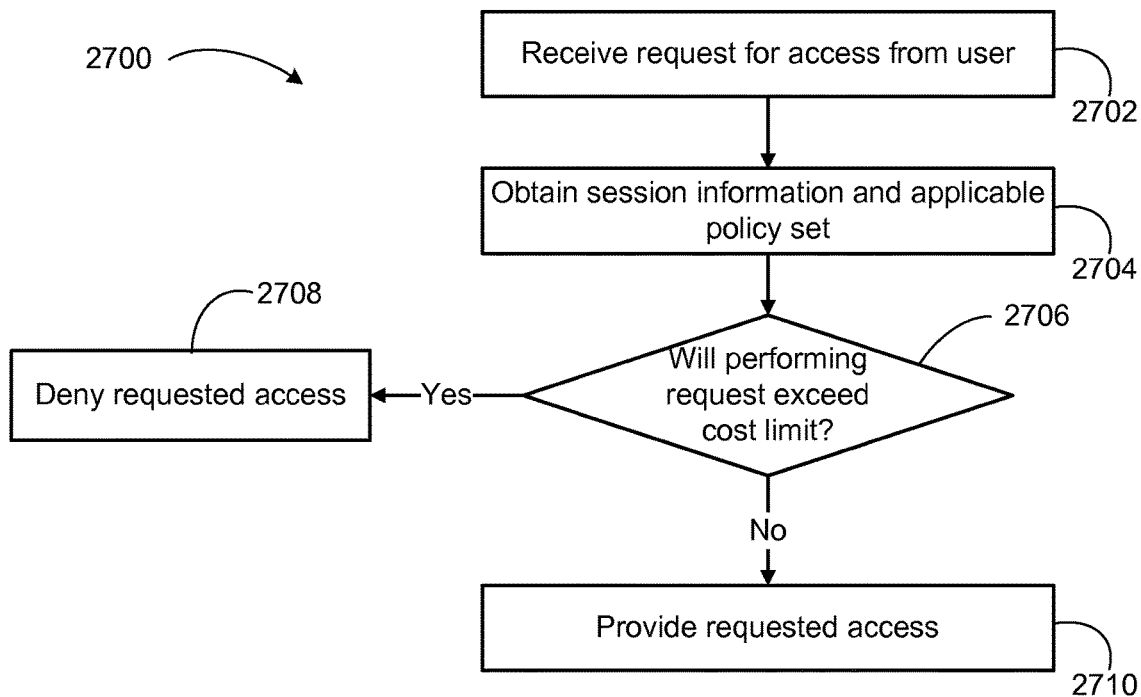
FIG. 27 is a flowchart depicting example steps of a process for providing access to a user in accordance with at least one embodiment.
FIG. 28 is an illustrative example of a message indicating that a request for access has been denied in accordance with at least one embodiment.

FIG. 27 accordingly provides an illustrative example of a process 2700 for utilizing various aspects of the present disclosure in connection with cost accounting in connection with a resource provider. In an embodiment, a request for access is received 2702 from the user and session information and applicable policy set are obtained 2704 such as in a manner described above. A determination may be made 2706 whether performing the request will result in the customer incurring charges that exceed a cost limit that is indicated in applicable policy. If the determination is made that performing a request will exceed the cost limit, the request may be denied such as in a manner described above. If, however, performing the request would not result in exceeding the cost limit, then the requested access may be provided 2710 such as in a manner described above. As noted above, a denial of a request for access may include providing information to a user that is informative of why the request was denied.

FIG. 28, for example, provides another example of an interface 2800 that provides information to the user about the request. In this particular example, the interface 2800 includes information informing the user that performing the requested operation would cause a cost limit to be exceeded. Various selectable interface elements may be selected by the user to obtain more information such as information on how it was determined that the cost limit would be exceeded. The user may then take corrective action in order to perform a request that would either not exceed the cost limit or perhaps that would update the policy to increase the cost limit.

Generally, the various embodiments described herein may be implemented in a wide variety of operating environments, which in some cases may include one or more user computers, computing devices, or processing devices which may be utilized to operate any of a number of applications.

User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for controlling access to one or more computing resources, comprising:
   authenticating, by one or more computing systems including one or more computer processors, multifactor authentication data for a user associated with a web service application programming interface (API) request for a resource associated with a session, the web service API request received from a first computer system;
   generating a session credential associated with the session that encrypts an indication as metadata that a multifactor authentication process has been successfully completed after authenticating the multifactor authentication data, the session credential indicating that a particular multifactor authentication process of a plurality of multifactor authentication processes has been successfully completed, the multifactor authentication process being based at least in part on the user's location and an identity of one or more applications associated with the web service API request;
   transmitting a web service API response to the first computer system including the session credential associated with the session;
   receiving, from a second computer system, the session credential in connection with one or more subsequent web service API requests associated with the session, the resource associated with an access control policy, the access control policy indicating that the particular multifactor authentication process is required and that the session credential encrypted the indication as metadata to access the resource, the second computer system receiving the session credential from the first computer system, the particular multifactor authentication process determined based at least in part on a type of the resource corresponding to the one or more subsequent web service API requests;
   determining, by the one or more computing systems, that the first computer system is authorized to transmit the session credential associated with the session to the second computer system, and that the second computer system is authorized to access the resource based at least in part on the access control policy and the session credential received from the second computer system; and
   authorizing, based at least in part on the determination, each subsequent web service API request of the one or more subsequent web service API requests of the session, from the second computer system, utilizing the session credential and the indication.

2. The computer-implemented method of claim 1, wherein the multifactor authentication process is configured to authenticate a one-time password, a smartcard, a fingerprint, a retina scan, a palm scan, a voice scan or print, or other biometric technique.

3. The computer-implemented method of claim 1, wherein the multifactor authentication process is based at least in part on an identity of one or more principals initiating the one or more subsequent web service API requests or an identity of one or more computing resources associated with the web service API request.

4. The computer-implemented method of claim 1, wherein the session credential is usable to access one or more computing resources multiple times for the one or more subsequent web service API requests.

5. The computer-implemented method of claim 1, wherein the one or more subsequent web service API requests are received from one or more principals different from the user.

6. The computer-implemented method of claim 1, wherein the session credential is encrypted.

7. A computer-implemented method for controlling access to one or more computing resources, comprising:
   receiving, by one or more computing systems including one or more computer processors, a web service application programming interface (API) request for a resource associated with a session from a first computer system associated with a multifactor authentication data of a user;
   generating a session token associated with the session that incorporates an indication as metadata that a multifactor authentication process has been successfully completed after authentication of the multifactor authentication data, the session token indicating that a particular multifactor authentication process of a plurality of multifactor authentication processes has been successfully completed, the multifactor authentication process being based at least in part on the user's location and an identity of one or more applications associated with the web service API request for the resource;
   transmitting, to the first computer system, a web service API response to the web service API request including the session token associated with the session;
   receiving, from a second computer system, the session token in connection with one or more subsequent web service API requests for one or more services associated with the session, the resource associated with an access control policy, the access control policy indicating that the particular multifactor authentication process is required and that the session token encrypted the indication as metadata to access the resource, each subsequent web service API request of the one or more subsequent web service API requests authenticated utilizing the session token and the indication, the second computer system receiving the session token from the first computer system, the particular multifactor authentication process determined based at least in part on a type of the resource corresponding to the one or more subsequent web service API requests;

determining, by the one or more computing systems, that the first computer system is authorized to transmit the session token associated with the session to the second computer system, and that the second computer system is authorized to access the resource based at least in part on the access control policy and the session token received from the second computer system; and providing, based at least in part on the indication incorporated by the session token and the determination, the one or more services requested in each of the one or more subsequent web service API requests of the session to the second computer system.

8. The computer-implemented method of claim 7, further comprising:

determining, based at least in part on the web service API request, the one or more services, or the multifactor authentication performed by the user, one or more policies for fulfilling the web service API request;

generating the session token incorporating the one or more policies; and determining, based at least in part on the one or more policies, whether to fulfill the web service API request.

9. The computer-implemented method of claim 7, wherein the multifactor authentication process includes the user providing at least two of: password information, information generated by an integrated circuit, biometric information, or information generated by a time-based token generation algorithm.

10. The computer-implemented method of claim 7, wherein the session token is usable to access one or more computing resources multiple times for the one or more services.

11. The computer-implemented method of claim 7, wherein the session token includes location information, information about applications associated with programmatic interface services, a time stamp for the session token, one or more policies limiting access in connection with the session token, an expiration time after which the session token is invalid, a starting time before which the session token is invalid, renewal parameters for renewing the session token, a signing key to be used to authenticate the one or more subsequent requests, restrictions on a number of uses allowed for the session token, data usage quotas for the one or more programmatic interface services, financial information associated with the one or more programmatic interface services, ownership information associated with one or more computing resources created or used for the one or more programmatic interface services, or permissions to be applied by default to the one or more computing resources created or used for the one or more programmatic interface services.

12. One or more non-transitory computer-readable storage media having collectively stored thereon instructions executable by one or more processors of a computing system that, when executed by the one or more processors, cause the computing system to at least:

authenticate multifactor authentication data for a user associated with a web service application programming interface (API) request for a resource associated with a session from a first computer system;

generate a session token associated with the session that incorporates an indication as metadata that a multifactor authentication process has been successfully completed based at least in part on the multifactor authentication data, the session token indicating that a particular multifactor authentication process of a plurality of multifactor authentication processes has been successfully completed, the multifactor authentication process being based at least in part on the user's location and an identity of one or more applications associated with the web service API request for the resource;

transmit a web service API response to the first computer system including the session token associated with the session;

receive, from a second computer system, the session token in connection with one or more subsequent web service API requests for the one or more services associated with the session, the resource associated with an access control policy, the access control policy indicating that the particular multifactor authentication process is required and that the session token encrypted the indication as metadata to access the resource, each subsequent web service API request of the one or more subsequent web service API requests authenticated utilizing the session token and the indication, the second computer system receiving the session token from the first computer system, the particular multifactor authentication process determined based at least in part on a type of the resource corresponding to the one or more subsequent web service API requests;

determine that the first computer system is authorized to transmit the session token associated with the session to the second computer system, and that the second computer system is authorized to access the resource based at least in part on the access control policy and the session token received from the second computer system; and authorize, based at least in part on the indication incorporated by the session token and the determination, access to the one or more services requested in each web service API request of the one or more subsequent web service API requests of the session from the second computer system.

13. The one or more non-transitory computer-readable storage media of claim 12, wherein the instructions executable by one or more processors of the computing system that, when executed by the one or more processors, further cause the computing system to at least:

determine, based at least in part on the web service API request, one or more policies associated with fulfilling the web service API request;

incorporate one or more representations of the one or more policies in the session token; and authorize, conditional at least in part on the one or more policies, access to the one or more services requested in the one or more subsequent web service API requests.

14. The one or more non-transitory computer-readable storage media of claim 12, wherein the multifactor authentication process comprises using at least two of a one-time password, a smartcard, a fingerprint, a retina scan, a palm scan, a voice scan or print, or other biometric technique.

15. The one or more non-transitory computer-readable storage media of claim 12, wherein the session token includes location information, information about applications associated with the services, a time stamp for the session token, one or more policies limiting access in connection with the session token, an expiration time after which the session token is invalid, a starting time before which the session token is invalid, renewal parameters for renewing the session token, a signing key to be used to authenticate the one or more subsequent requests, restrictions on a number of uses allowed for the session token, data usage quotas for the one or more services, ownership information associated with one or more computing resources created or used for the one or more services, or permissions to be applied by default to the one or more computing resources created or used for the one or more services.

16. The one or more non-transitory computer-readable storage media of claim 12, wherein the session token includes a financial cost associated with the one or more services.

* * * * *